(12) United States Patent
Burch et al.

(10) Patent No.: US 8,053,527 B2
(45) Date of Patent: *Nov. 8, 2011

(54) FLUOROPOLYMER COMPOSITION

(75) Inventors: Heidi Elizabeth Burch, Parkersburg, WV (US); Sundar Kilnagar Venkataraman, Avondale, PA (US); Ralph Munson Aten, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,706

(22) Filed: Jan. 12, 2010

(65) Prior Publication Data

US 2010/0113702 A1 May 6, 2010

Related U.S. Application Data

(63) Continuation of application No. 11/601,140, filed on Nov. 16, 2006.

(60) Provisional application No. 60/738,351, filed on Nov. 18, 2005.

(51) Int. Cl.
C08L 27/12 (2006.01)
C08F 8/00 (2006.01)

(52) U.S. Cl. ........................ 525/199; 525/191

(58) Field of Classification Search .................. 525/191, 525/199
See application file for complete search history.

(56) References Cited

U.S. PATENT DOCUMENTS

| | | | |
|---|---|---|---|
| 2,685,707 A | 8/1954 | Llewellyn et al. | |
| 3,142,665 A | 7/1964 | Cardinal et al. | |
| 3,819,594 A | 6/1974 | Holmes et al. | |
| 4,036,802 A | 7/1977 | Poirier | |
| 4,380,618 A | 4/1983 | Khan et al. | |
| 4,624,990 A | 11/1986 | Lunk et al. | |
| 4,722,122 A | 2/1988 | Overbay | |
| 4,914,158 A | 4/1990 | Yoshimura et al. | |
| 4,952,630 A | 8/1990 | Morgan et al. | |
| 5,677,404 A | 10/1997 | Blair | |
| 5,708,131 A | 1/1998 | Morgan | |
| 5,932,673 A | 8/1999 | Aten et al. | |
| 6,429,258 B1 | 8/2002 | Morgan et al. | |
| 6,583,226 B1 * | 6/2003 | Kaulbach et al. | 525/199 |
| 6,841,594 B2 | 1/2005 | Jones et al. | |
| 6,870,020 B2 | 3/2005 | Aten et al. | |
| 2004/0242783 A1 | 12/2004 | Yabu et al. | |
| 2005/0187328 A1 | 8/2005 | Globus et al. | |

FOREIGN PATENT DOCUMENTS

| | | |
|---|---|---|
| EP | 0 481 509 A2 | 4/1992 |
| EP | 0 606 493 A1 | 7/1994 |
| EP | 0 735 093 A1 | 10/1996 |
| EP | 0 322 877 | 1/2010 |
| WO | 03022923 A1 | 3/2003 |

OTHER PUBLICATIONS

Cogswell, F. N., "Polymer Melt Rheology, A Guide for Industrial Practice", Publlished by Woodhead Publishing, 1996, p. 31.

* cited by examiner

Primary Examiner — Irina S Zemel
Assistant Examiner — Jeffrey Lenihan

(57) ABSTRACT

A melt-mixed composition of non-melt flowable polytetrafluoroethylene (PTFE) and melt-fabricable perfluoropolymer is provided that exhibits thixotropy at increasing shear rate in the molten state and high elongation at break even at PTFE concentrations well above 4 wt %, based on the combined weight of the PTFE and the perfluoropolymer, e.g. at least 200% up to at least 30 wt % PTFE, the composition also exhibiting the structure of a dispersion of submicrometer-size particles of the PTFE in a continuous phase of the melt-fabricable perfluoropolymer.

8 Claims, No Drawings

FLUOROPOLYMER COMPOSITION

BACKGROUND OF THE INVENTION

1. Field of the Invention

This invention relates to fluoropolymer compositions of polytetrafluoroethylene and other perfluoropolymers.

2. Description of Related Art

US 2004/0242783 A1 discloses a blend of tetrafluoroethylene/hexafluoropropylene copolymer, commonly called FEP, and polytetrafluoroethylene (PTFE), the PTFE imparting the improved extrusion property of reduced cone breaks during melt draw down extrusion coating of wire. The PTFE content of the blend is disclosed to be 0.03 to 2 parts by weight based on 100 parts by weight of the copolymer. When the amount of PTFE is more than 2 parts by weight, two disadvantageous results are disclosed: the melt viscosity of the blend increases significantly and the molded article tends to become brittle [0027]. These are the same effects as adding filler to a polymer, except that in the case of adding PTFE to FEP, the disadvantageous effects arise with even small additions of the PTFE to the FEP.

SUMMARY OF THE INVENTION

The present invention includes the discovery of melt-fabricable perfluoropolymer compositions containing PTFE in much greater amounts than 2 parts by weight per 100 parts by weight of the perfluoropolymer that have desirable viscosities for melt fabrication and that do not become brittle. According to one embodiment, the present invention is a melt-mixed composition comprising non-melt flowable polytetrafluoroethylene (PTFE) and melt-fabricable perfluoropolymer, said PTFE constituting at least 4 wt % of the combined weight of said PTFE and said melt-fabricable perfluoropolymer, said composition exhibiting thixotropy when being subjected to increasing shear in the molten state. Thus, the compositions of the present invention exhibit reduced melt viscosity at increasing shear rate. Under shear conditions used in melt mixing involved in melt fabrication, the melt viscosity of the composition becomes low enough to enable the compositions to be melt-fabricated, notwithstanding that the PTFE is non melt flowable, i.e. the PTFE has such a high viscosity in the molten state that it does not flow and therefore is not melt-processible. Preferably this thixotropy is characterized by a reduction in melt viscosity upon increasing the shear rate applied to the molten dispersion from about $10 \, s^{-1}$ to $100 \, s^{-1}$ that is at least about 10% greater, preferably at least about 100% greater, than the reduction in melt viscosity at the same shear rates for the melt-fabricable perfluoropolymer by itself, as determined by the capillary rheometer method described later herein. The thixotropy imparted to the perfluoropolymer by non-melt flowable PTFE is a surprising result and exists for high contents for the PTFE, e.g. up to about 65 wt % thereof and even up to about 75 wt % thereof, based on the combined weight of the PTFE and the melt-fabricable perfluoropolymer.

The melt-fabricable perfluoropolymer component of the composition of the present invention imparts melt-fabricability to the composition. Thus, the composition is melt-fabricable by such processes as extrusion and injection molding to form strong, tough products. Some indicia of this strength and toughness are the tensile and flexural properties of the composition disclosed herein.

The fact that the composition of the present invention is not brittle is evident from the fact that it exhibits a high elongation at break. Preferably, its elongation at break is at least about 200%, more preferably at least about 250%, at up to at least about 30 wt % PTFE in the composition, based on the combined weight of the PTFE and perfluoropolymer. Most preferably, the composition exhibits an elongation at break that is at least as high as that of the melt-fabricable perfluoropolymer by itself, indicating that the presence of the PTFE is not making the composition brittle. This effect extends well above the 4 wt % PTFE content of the composition, preferably at least to up to about 15 wt % PTFE, based on the combined weight of the PTFE and melt-fabricable perfluoropolymer. The composition of the present invention also exhibits properties indicating that the PTFE in the composition is reinforcing the composition, rather than acting as a filler. For example, both the tensile strength and elongation at break can be greater than for the melt-fabricable perfluoropolymer by itself. Another indicia of the composition of the present invention not being brittle arises from its exhibiting an MIT Flex Life of at least 500 cycles, preferably at least 1000 cycles, i.e. film made from the composition by the MIT Flex Life test procedure is flexed over upon itself repeatedly without breaking. Preferably the MIT flex life of the composition is at least as great as for the perfluoropolymer by itself. The melt-mixed composition of this embodiment of the present invention can be considered as a melt blend of the PTFE and perfluoropolymer components.

According to another embodiment, the present invention is a melt-mixed composition comprising a dispersion of submicrometer-size particles comprising non-melt flowable polytetrafluoroethylene (PTFE) in a continuous phase comprising melt-fabricable perfluoropolymer, said dispersion exhibiting thixotropy when subjected to increasing shear in the molten state. The continuous phase being the melt flowable perfluoropolymer is confirmed by the melt fabricability of the melt mixed composition. Articles molded from the composition are transparent to translucent, rather than opaque as are articles molded from PTFE.

Both the non-brittle and thixotropic attributes described above are believed to arise from this novel dispersion/continuous phase structure, wherein the PTFE is present in such small particle size within the perfluoropolymer continuous phase. This novel structure exists at compositions containing less than 4 wt % PTFE although this is a preferred minimum amount. For example, the melt-mixed dispersion composition can contain as little as about 0.1 wt % PTFE based on the combined weight of the PTFE and perfluoropolymer, and the dispersion structure can exist for amounts of PTFE greater than about 50 wt %, e.g. up to about 65 wt % PTFE and even up to about 75 wt %, based on the combined weight of the PTFE and perfluoropolymer, because of the small size of the PTFE particle. All of the thixotropy, elongation at break, tensile strength, and MIT Flex Life parameters applied to the first mentioned embodiment of the present invention also apply to this embodiment.

The melt-mixed nature of the compositions of the present invention means that it has been preferably heated to the state at which both the PTFE and the perfluoropolymer are molten and then the molten mass is subjected to mixing of the two polymers together, such as may occur in the typical melt fabrication processes of extrusion or injection molding. In the case of extrusion, the extruded, melt-mixed product can be molding pellets for further melt fabrication into final product or final product. Thus, the compositions of the present invention can be in any form such as the molding pellet or final product form formed by melt fabrication process.

It is surprising that compositions of the present invention can contain much more PTFE than 2/100 parts by weight and exhibit the properties described above, denoting melt-fabricability and absence of brittleness. US 2004/0242783 A1 discloses the uses of a multi-screw kneader in an attempt to homogeneously disperse the small amount of PTFE in the FEP [0029] and the use of pre-mixing to improve the degree of dispersion of the PTFE [0042], indicating that the dispersion achieved by the multi-screw kneader by itself is deficient. In Example 1 of '783, powders of the PTFE and copolymer are mixed together, followed by kneading in a twin-screw extruder to produce molding pellets, which are then melt-draw down extruded, using a single screw extruder, as a coating onto wire. The PTFE powder used in the premixing has an average particle size of 450 micrometers. The particle size of the FEP is not disclosed in Example 1, but the aqueous emulsion polymerization to obtain this copolymer is disclosed. This copolymer is recovered from emulsion polymerization by coagulation, which provides a dry powder particles that are agglomerates of the FEP particles of the emulsion. The FEP particles of the emulsion are the primary particles, which are submicrometer-size in average particle size so as to be in the emulsion state. The agglomerates of the primary particles are the secondary particles, which are typically hundreds of time larger in diameter than the primary particles. The 450 micrometer PTFE fine powder particles used in the Example are secondary particles. Thus, in Example 1, secondary particles of the FEP and of the PTFE are pre-mixed before kneading in a twin screw extruder.

The novel structure of the melt-mixed compositions of the present invention, wherein the PTFE is dispersed in a continuous phase of the melt-fabricable perfluoropolymer, is obtained by carrying out the melt mixing on a mixture of submicrometer-size particles of the PTFE and of the melt-fabricable perfluoropolymer. Thus, these polymers are present as a mixture of primary particles, rather than secondary particles. This mixture can be achieved by providing the PTFE primary particle inside the perfluoropolymer particle, i.e. in the form of a core/shell polymer. Alternatively, each of the polymers can be provided in the form of aqueous dispersions, e.g. from the aqueous dispersion polymerization process for making each of them, followed by mixing these dispersions together to form the mixture of primary particles of each polymer. Core/shell polymer is preferred, because of the greater intimacy of the two polymers and the ability of the molten perfluoropolymer to integrate the particles together without needing to overcome the incompatibility between the melt-fabricable perfluoropolymer and the PTFE. Thus, the melt mixing converts the mixture of primary particles that already exists into the composition of the present invention, whether considered as a melt blend or as a dispersion as described above.

DETAILED DESCRIPTION OF THE INVENTION

The PTFE and melt-fabricable perfluoropolymer components of the melt-mixed compositions of the present invention will be described individually hereinafter, sometimes with reference to their being supplied to the melt-mixed composition as a core/shell polymer. This description of polymer components, however, also applies to the supply of these polymers to the melt-mixed composition from separate sources, e.g. from the combination of core/shell polymer (PTFE core/perfluoropolymer shell) and separately supplied perfluoropolymer or from separately supplied PTFE and perfluoropolymer.

With respect to the PTFE component, the non-melt flowability of the PTFE can also be characterized by high melt creep viscosity, sometimes called specific melt viscosity, which involves the measurement of the rate of elongation of a molten sliver of PTFE under a known tensile stress for 30 min., as further described in and determined in accordance with U.S. Pat. No. 6,841,594, referring to the specific melt viscosity measurement procedure of U.S. Pat. No. 3,819,594. In this test, the molten sliver made in accordance with the test procedure is maintained under load for 30 min, before the measurement of melt creep viscosity is begun, and this measurement is then made during the next 30 minutes of applied load. The PTFE preferably has a melt creep viscosity of at least about $1 \times 10^6$ Pa·s, more preferably at least about $1 \times 10^7$ Pa·s, and most preferably at least about $1 \times 10^8$ Pa·s, all at 380° C. This temperature is well above the first and second melt temperatures of PTFE of about 343° C. and 327° C., respectively. The difference between non-melt flowability of the PTFE core and the melt flowability of the melt-fabricable perfluoropolymer shell is apparent from the melt flow rate (MFR) test procedure of ASTM D 1238-94a. In this procedure, the MFR is determined by the rate in g/10 min that perfluoropolymer that flows through a defined orifice under a specified load at a specified temperature, usually 372° C. The PTFE used in the present invention has no melt flow (zero MFR). The high melt creep viscosity of the PTFE present in the core of the core/shell polymer also means that the PTFE is sinterable, i.e. a molded article, unsupported by the mold (free-standing), of the PTFE can be heated above the melting point of the PTFE to coalesce the PTFE particles without the molded article flowing to lose its shape. The PTFE used in the present invention is also often characterized by standard specific gravity (SSG), which is the ratio of weight in air of a PTFE specimen prepared in a specified manner to an equal volume of water at 23° C. as further described in U.S. Pat. No. 4,036,802 and ASTM D 4894-94. The lower the SSG, the higher the molecular weight of the PTFE. The specimen preparation procedure as disclosed in ASTM D-4894-94 includes compression molding the test specimen, removing the compression molded test specimen from the mold, and sintering the specimen in air, i.e. free standing, at 380° C. The non-melt flowability of the PTFE enables this sintering to be carried out without the test specimen losing its compression molded shape and dimensions.

The PTFE can be the granular type or the fine powder type, made by suspension or aqueous dispersion polymerization, respectively. The PTFE can be homopolymer of tetrafluoroethylene or a copolymer thereof with a small amount of comonomer, such as hexafluoropropylene or perfluoro(alkyl vinyl ether), preferably wherein the alkyl group contains 1 to 5 carbon atoms, that improves the sinterability of the TFE, to obtain such improvement as reduced permeability and greater flex life, as compared to the TFE homopolymer. This type of PTFE is sometimes referred to as modified PTFE. Examples of modified PTFE are disclosed in U.S. Pat. Nos. 3,142,665, 3,819,594, and 6,870,020. For simplicity and because the modified PTFE exhibits the same non-melt flow, high melt creep viscosity of PTFE homopolymer, this type of PTFE is included in the term polytetrafluoroethylene or PTFE used herein.

The non-melt flowable PTFE used in the present invention is to be distinguished from low molecular weight PTFE, which because of its low molecular weight has melt flowability but not melt-fabricability. This melt flowable PTFE, which has an MFR that is measurable by ASTM D 1238-94a, is obtained by direct polymerization under conditions that prevent very long polymer chains from forming, or by irradiation degradation of non-melt flowable PTFE. Such melt flowable PTFE is commonly called PTFE micropowder. It is not considered as being melt fabricable because the article molded from the melt is useless, by virtue of extreme brittleness.

Because of its low molecular weight (relative to non-melt-flowable PTFE), it has no strength. An extruded filament of the PTFE micropowder is so brittle that it breaks upon flexing.

With respect to the melt-fabricable perfluoropolymer component of the melt-mixed composition of the present invention, as indicated by the prefix "per" in perfluoropolymer, the monovalent atoms bonded to the carbon atoms making up the polymer are all fluorine atoms. Other atoms may be present in the polymer end groups, i.e. the groups that terminate the polymer chain. The perfluoropolymer is a perfluoroplastic, not a perfluoroelastomer.

If the non-melt flowable PTFE and melt-fabricable perfluoropolymer is supplied to the melt-mixed composition of the present invention as core/shell polymer, the PTFE forms the core and the perfluoropolymer forms the shell.

The melt flow rate (MFR) of the perfluoropolymers used in the present invention can vary widely, depending on the proportion of PTFE, the melt-fabrication technique desired for the core/shell polymer or melt-mixed composition, as the case may be, and the properties desired in the melt-fabricated article. Thus, MFRs for the melt-fabricable perfluoropolymer can be in the range of about 0.1 to 500 g/10 min, but will usually be preferred as about 0.5 to 100 g/10 min, and more preferably 0.5 to 50 g/10 min., as measured according to ASTM D-1238-94a and following the detailed conditions disclosed in U.S. Pat. No. 4,952,630, at the temperature which is standard for the resin (see for example ASTM D 2116-91a and ASTM D 3307-93 that are applicable to the most common melt-fabricable perfluoropolymers, both specifying 372° C. as the resin melt temperature in the Plastometer®). The amount of polymer extruded from the Plastometer® in a measured amount of time is reported in units of g/10 min in accordance with Table 2 of ASTM D 1238-94a. If the perfluoropolymer is present as the shell of core/shell polymer, the MFR of the perfluoropolymer in the shell is determined by carrying out the polymerization of the perfluoromonomers used to form the perfluoropolymer by themselves, i.e. no core, using the same recipe and polymerization conditions used to form the shell, to obtain perfluoropolymer that can be used in the MFR determination. The higher the MFR of the perfluoropolymer, the greater is the tendency to generate smoke when the polymer is subjected to the NFPA-255 burn test, thus failing such test. The shell can have high MFR, e.g. greater than 20 g/10 min without the article melt-fabricated from the core/shell polymer or separately-supplied PTFE and perfluoropolymer components failing the NFPA-255 burn test, because in the presence of the PTFE, the article molded from the melt-mixed composition, notably as dispersed submicrometer-size particles in a perfluoropolymer continuous phase does not flow, and thus, does not drip to cause smoke generation.

Even when the core/shell polymer exhibits an MFR of 0 g/10 min, i.e. there is no flow of the polymer when measured by ASTM D 1238-94a at the temperature that is standard for the melt-fabricable perfluoropolymer, the core/shell polymer can still be melt-fabricable. The thixotropy exhibited by the core/shell polymer and by the mixture of separately supplied PTFE and perfluoropolymer components, as submicrometer-size particles when subjected to the higher shear associated with melt fabrication enables the melt mixing and melt fabrication to occur.

The melt-fabricability of the melt-mixed compositions of the present invention can also be characterized by their melt flowability, which enables the melt fabrication to be carried out. In this regard, these compositions preferably have a melt viscosity of no more than about $5 \times 10^5$ Pass, more preferably, no more than about $1 \times 10^5$ Pass, and most preferably, no more than about $5 \times 10^4$ Pass, all at a shear rate of 100 s$^{-1}$ and melt temperature in the range of about 350° C. to 400° C. The determination of melt viscosities disclosed herein, unless otherwise indicated, is by dividing shear stress applied to the polymer melt by shear rate applied to the polymer melt as disclosed on p. 31 of F. N. Cogswell, *Polymer Melt Rheology, A Guide for Industrial Practice*, published by Woodhead Publishing (1996). As a practical matter, the equivalent melt viscosities are obtained simply by readout from the computer accompanying the rheometer used to determine shear rate and shear stress. The melt viscosity of the melt-fabricable perfluoropolymer by itself is such that the above mentioned melt viscosities for the polymer mixture are obtained. The melt viscosity of the perfluoropolymer component by itself can also be characterized by the above mentioned melt viscosities.

Examples of melt-fabricable perfluoropolymers that can be used in the shell of the polymer of the core/shell polymer or as separately supplied polymer include the copolymers of tetrafluoroethylene (TEE) with one or more polymerizable perfluorinated comonomers, such as perfluoroolefin having 3 to 8 carbon atoms, such as hexafluoropropylene (HFP), and/or perfluoro(alkyl vinyl ether) (PAVE) in which the linear or branched alkyl group contains 1 to 5 carbon atoms. Preferred PAVE monomers include perfluoro(methyl vinyl ether) (PMVE), perfluoro(ethyl vinyl ether) (PEVE), perfluoro(propyl vinyl ether) (PPVE), and perfluoro(butyl vinyl ether) (PBVE). The copolymer can be made using several PAVE monomers, such as the TFE/perfluoro(methyl vinyl ether)/perfluoro(propyl vinyl ether) copolymer, sometimes called MFA by the manufacturer. The preferred perfluoropolymers are TFE/HFP copolymer in which the HFP content is about 5-17 wt %, more preferably TFE/HFP/PAVE such as PEVE or PPVE, wherein the HFP content is about 5-17 wt % and the PAVE content, preferably PEVE, is about 0.2 to 4 wt %, the balance being TFE, to total 100 wt % for the copolymer. The TFE/HFP copolymers, whether or not a third comonomer is present, are commonly known as FEP. TFE/PAVE copolymers, generally known as PFA, have at least about 2 wt % PAVE, including when the PAVE is PPVE or PEVE, and will typically contain about 2-15 wt % PAVE. When PAVE includes PMVE, the composition is about 0.5-13 wt % perfluoro(methyl vinyl ether) and about 0.5 to 3 wt % PPVE, the remainder to total 100 wt % being TFE, and as stated above, may be referred to as MFA. The low melt viscosity of these copolymers relative to the high melt creep viscosity of the PTFE, provides the melt flowability to the perfluoropolymer for its melt fabricability, and the perfluoropolymer composition itself provides the strength required for the practical utility of the article melt fabricated from the perfluoropolymer. The melt flow difference between the melt-fabricable perfluoropolymer being characterizable by melt viscosity and MFR and the non-melt flowable PTFE being characterizable by melt creep viscosity and SSG is great. The melt-fabricable perfluoropolymer cannot be characterized by either melt creep viscosity or by SSG. In the melt creep viscosity test, the sliver of molten perfluoropolymer melts, flows, and breaks during the 30 minutes initial heating under load at 380° C., so there is no sliver remaining for the melt creep determination during the second 30 minutes of heating. In the SSG test, the specimen (polymer) melts and flows during the 380° C. heating (sintering for non-melt flowable PTFE), undermining the integrity of the specimen for the SSG determination. Of course, the non-melt flowability of the PTFE used in the present invention, enables the melt creep viscosity and SSG determinations to be made on such PTFE.

The perfluoropolymer comonomer content of core/shell polymer and of the melt-fabricable perfluoropolymer by itself is determined by infrared analysis on compression molded film made from the core/shell polymer particles in accordance with the procedures disclosed in U.S. Pat. No. 4,380,618 for the particular fluoromonomers (HFP and PPVE) disclosed therein. The analysis procedure for other fluoromonomers are disclosed in the literature on polymers containing such other fluoromonomers. For example, the infrared analysis for PEVE is disclosed in U.S. Pat. No. 5,677,404. The perfluoropolymer shell composition is made to have a composition that is predictable from copolymerization to make the perfluoropolymer by itself. The perfluoropolymer composition of the core/shell polymer used in the present invention, however, is determined on the entire core/shell polymer. The composition of the shell is calculated by subtracting the weight of the TFE consumed to make the PTFE core. The perfluoromonomer content other than TFE of the core/shell polymer is preferably at least 1.5 wt % based on the total weight of the TFE and perfluoromonomer in the core/shell polymer, but concentrated in the shell. The perfluoropolymer content of the melt-mixed composition when the perfluoropolymer is separately supplied to the composition, i.e. not as core/shell polymer, is the weight % of the perfluoropolymer component used to form the melt mixed composition, based on the combined weights of the PTFE and perfluoropolymer components used to form the composition.

The combination of the non-melt flowable PTFE core and melt fabricable perfluoropolymer shell of the polymer results in a core/shell polymer that is also melt fabricable. Although the presence of the non-melt flowable PTFE core may lower the MFR of the overall polymer as compared to the MFR of the perfluoropolymer shell, and may even render the MFR not measurable by ASTM D 1238-94a, the thixotropy exhibited by the polymer when subjected to sufficient shear in the molten state enables the resultant melt blend to be melt fabricated. This effect extends over the entire range of core/shell compositions. At least about 0.1 wt % PTFE core is required before the thixotropic effect is appreciable. The maximum amount of PTFE core is preferably up to that amount that enables the core to be the dispersed phase when the core/shell polymer is melt-mixed, such as occurs in extrusion or injection molding. The thixotropic phenomenon observed for the core/shell polymer also exists for the melt-mixed composition wherein the PTFE and perfluoropolymer components are separately supplied as submicrometer-size particles, except that the thixotropy obtained from the core/shell polymer is greater than for the melt-mixed composition derived from the separately supplied polymers. In either case, the preferred reduction in viscosity is at least about 100%, and more preferably at least about 500% greater than the viscosity reduction for the perfluoropolymer by itself when the shear rate is increased from about $10\ s^{-1}$ to about $100\ s^{-1}$. These shear rates are expressed in terms of "about", because of limitations in the operation of the rheometer used to measure them. The rheometer includes a variable speed piston that provides the volumetric flow rate (Q) of molten polymer through the rheometer orifice and various orifice sizes, the selection of which provides the radius r in the equation: shear rate $(\gamma)=4Q/\pi r^3$. With particular rheometers it may be difficult to adjust the piston speed and orifice size such that the exact shear rates of $10\ s^{-1}$ and $100\ s^{-1}$ are obtained. The shear rates used in the Examples were $11.9\ s^{-1}$ and $101\ s^{-1}$. Typically, the rheometer can be operated so that the shear rates are $10\ s^{-1} \pm 3\ s^{-1}$ and $100\ s^{-1} \pm 5\ s^{-1}$. In absolute terms, the preferred reduction in melt viscosity by the core/shell polymer of the present invention is at least about 200 Pa·s, more preferably at least about 400 Pa·s at the shear rates specified above.

The advantage of thixotropy discovered by the present invention extends to higher shear rates than $100\ s^{-1}$ enabling the melt-mixed composition of the present invention to be extruded at a faster rate by melt-draw down extrusion than the melt-fabricable perfluoropolymer by itself. Alternatively, the melt cone formed in melt-draw-down extrusion can have a lower draw-down ratio (DDR) than the usual DDR of 80 to 100:1, to improve concentricity of the wall thickness of the extrudate, applied for example as jacketing on FEP insulated communications cable, especially such cable used in plenums of buildings. DDR is the ratio of the cross-sectional area of the annular die opening to the cross-sectional area of the final shape and size of the extrudate, e.g. the plenum cable jacket just described.

Within the above composition range, various improvements in physical properties exist. Preferably, the non-melt flowable polytetrafluoroethylene content is about 4 to 50 wt % based on the combined weight of the non-melt flowable polytetrafluoroethylene and melt-fabricable perfluoropolymer. As the PTFE wt % increases from 2 wt % based on the combined weight of the PTFE and perfluoropolymer components of the composition, the elongation and/or tensile strength increase, indicating reinforcement of the perfluoropolymer continuous phase by the dispersed core particles. This reinforcement extends to much greater amounts of PTFE, e.g. up to 20 wt % PTFE, more preferably up to 30 wt % PTFE, and most preferably up to at least 40 wt % PTFE, 4 wt % PTFE core being the preferred minimum, all percents being based on the combined weight of the PTFE and perfluoropolymer components. Alternatively, either the perfluoropolymer composition or its MFR can be adjusted to optimize melt flow either for high production rate melt fabrication or the production of intricately molded shapes, while still retaining adequate physical properties for the particular utility intended. For example, the elongation at break of the melt-mixed composition of the present invention is preferably at least about 200% for compositions containing up to at least about 30 wt % PTFE, preferably at least about 40 wt %, based on the combined weight of the PTFE and perfluoropolymer components. The foregoing characterizations of the compositions apply to core/shell polymer when used to supply the polymer components to the composition, and to these components when separately supplied, notwithstanding the fact that core/shell polymer typically provides the best results in terms of reduction in melt viscosity with increasing shear and such physical properties as elongation at break and tensile strength.

The process of melt blending the core/shell polymer or separately supplied PTFE and perfluoropolymer components can also be described by the advantageous property results, e.g. the melt blend exhibiting thixotropy characterized by the at least about 10%, at least about 100%, or at least about 500% reductions in melt viscosity when the shear rate is increased from about $10\ s^{-1}$ to about $100\ s^{-1}$ by the capillary rheometer method. Alternatively or in combination with this thixotropy, the melt-mixed composition, whether from core/shell polymer or separately supplied polymers, preferably exhibits an elongation of at least about 200% up to at least 30 wt % of the core/shell polymer being the PTFE, more preferably, at least 40 wt % of the composition being the PTFE. Example 50 discloses greater than 200% elongation for a composition containing about 75 wt % PTFE. The resultant melt blend and articles molded therefrom can also have the structure described above, wherein the PTFE is dispersed as submicrometer-size particles in continuous phase of the melt-fabricable perfluoropolymer.

The core/shell polymer useful in the present invention can be made by aqueous dispersion polymerization. In one embodiment, the non-melt flowable PTFE core is prepared in a polymerization that is separate from the polymerization forming the shell melt-fabricable perfluoropolymer, and this core is used to seed the polymerization of the perfluoromonomer forming the melt-fabricable perfluoropolymer shell onto the core. In another embodiment, the core is formed in situ, followed by the polymerization to form the shell on the core. In this embodiment, the non-melt flowable PTFE core is formed by polymerization of TFE. Then the TFE (and initiator) feed to the polymerization reactor is stopped. The polymerization reaction is allowed to complete itself, and the transition to the copolymerization to form the shell polymer will depend on the copolymerization system being used. For example, the TFE remaining in the reactor can be permitted either to be consumed by the PTFE polymerization or to be vented off, and in either case, the copolymerization system for the shell polymer is then established. Alternatively, the copolymerization system for the shell polymer is established while maintaining the TFE concentration in the reactor constant. Then the copolymerization to form the shell is started. Addition of the comonomer along with additional TFE to the reactor will depend on the comonomer. When the comonomer is HFP, the total amount will typically be added at the commencement of the copolymerization reaction. When the comonomer is PAVE, it too may be added at the commencement of the copolymerization reaction or co-fed to the reactor with the TFE feed to the copolymerization reaction. Agitation of the aqueous medium and initiator addition may be stopped when the initial charge of comonomer is fed to the reactor to avoid premature coagulation of the PTFE core. The copolymerization to form the shell is carried out to obtain the relative amount of shell polymer desired and particle size of the core/shell polymer.

The core/shell polymer is preferably formed by first forming the core in situ, followed by the copolymerization to form the shell. This provides a better integration of the shell with the core, by chemical bonding between the core and the shell, wherein the shell copolymer acts as a compatibilizing agent with other melt-fabricable perfluoropolymer (from other core/shell polymer particles or from independently supplied melt-fabricable perfluoropolymer), enabling the matrix of the blend to be formed and the PTFE core particles to become dispersed upon melt mixing without causing disruptions within the matrix that would detract from physical properties.

The polymerization to form the non-melt flowable PTFE core, whether by seed polymerization, by suspension or aqueous dispersion polymerization or in situ is conventional polymerization to form the non-melt flowable PTFE. The polymerization to form the shell is also conventional aqueous dispersion polymerization. Examples of initiators used in both polymerizations include ammonium persulfate, potassium persulfate, bis(perfluoroalkane carboxylic acid) peroxide, azo compounds, permanganate oxalic acid system, and disuccinic acid peroxide. Examples of dispersing agents used in the aqueous dispersion polymerizations include ammonium perfluorooctanoic and perfluoroalkyl ethane sulfonic acid salts, such as the ammonium salt.

A typical aqueous dispersion polymerization process as known in the art involves the steps of precharging an aqueous medium to a stirred autoclave, deoxygenating, pressurizing with TFE to a predetermined level, adding modifying comonomer if desired, agitating, bringing the system to desired temperature, e.g., 60°-100° C., introducing initiator, adding more TFE according to predetermined basis, and regulating temperature. Initiator addition, at the same or different rate, may continue throughout the batch or only for part of the batch. Recipe and operating parameters not fixed by the equipment are commonly selected in order that temperature is maintained approximately constant throughout the polymerization. This same general procedure is followed for polymerizing the perfluoromonomers to make the melt-fabricable perfluoropolymer, except that the polymerization temperature and order of addition of the TFE and the other perfluoromonomer will depend on the identity of the additional perfluoromonomer. Examples of general procedures for making melt-fabricable perfluoropolymer are disclosed in U.S. Pat. No. 5,677,404 (FEP) and U.S. Pat. No. 5,932,673 (PFA). The transition between the polymerization to make the core and the polymerization to make the shell can be varied as will be shown in the Examples herein. The timing of the transition is set in order to obtain the weight proportion of PTFE core desired in the core shell polymer. The weight % core can be determined by comparing the weight of TFE consumed in the polymerization of the core with the weight of perfluoromonomers, e.g. TFE plus NFP or perfluoro(alkyl vinyl ether) consumed in the polymerization of the shell.

The particle size of the core/shell polymer or separately polymerized PTFE or melt fabricable perfluoropolymer is small enough that the polymer particles remain dispersed in the aqueous medium until the polymerization reaction is completed, whereupon the dispersed core/shell polymer particles can be intentionally coagulated, by such conventional means as increased agitation from the agitation applied during polymerization or by addition of electrolyte. Alternatively, the coagulation can be done by freeze/thaw method such as disclosed in U.S. Pat. No. 5,708,131 (Morgan).

Typically, the average as-polymerized polymer particle size (diameter), referred to as RDPS (raw dispersion particle size) in the Examples, will be less than one micrometer (submicrometer-size) as determined by the laser light scattering method of ASTM D 4464. Preferably the average polymer particle size is less than about 0.5 micrometer, more preferably less than about 0.3 micrometer, and even more preferably, less than about 0.25 micrometer and most preferably less than about 0.2 micrometer. These particle sizes apply to the particles of PTFE, melt-fabricable perfluoropolymer, and to the core/shell polymer used to form the composition of the present invention. The smaller the average core/shell polymer particle size, the more stable the aqueous dispersion of the polymer particles, enabling the polymerization to be carried out to higher polymer solids content before stopping the polymerization and carrying out coagulation. The average particle size of the core of the core/shell polymer will vary with overall size of the core/shell polymer and the weight proportion of the core desired and will in any event, be smaller than the particle size of the core/shell polymer particles. Thus, since the core/shell polymer particles are on average submicrometer-size, so will the core particles be submicrometer-size when the core/shell polymer particles are melt-mixed to form the continuous phase of melt-fabricable perfluoropolymer with the core PTFE particles dispersed therein. Similarly, for each of the core/shell polymer average particle sizes cited above, the core particles will be smaller. Thus, for the average core/shell polymer particle size of less than about 0.3 micrometer, the average particle size of the core therein will also be less than about 0.3 micrometers. The particle size of the core in the core/shell polymer incorporated into the melt blend is understood to be the size of the particles of PTFE in the melt blend and articles melt-fabricated from the melt blend, because of the non-melt flowability of the PTFE.

The as-polymerized core/shell polymer particle sizes described above are the primary particles (sizes) of the polymer. Coagulation of the aqueous dispersion of the core/shell primary particles and co-coagulation of the mixed together separately prepared aqueous dispersions of PTFE particles and particles of melt-fabricable perfluoropolymer causes these particles to agglomerate together, and upon drying to become a fine powder having an average particle size depending on the method of coagulation, but of at least about 300 micrometers, as determined by the dry-sieve analysis disclosed in U.S. Pat. No. 4,722,122. The agglomerates of primary particles and thus the particles of the fine powder are often referred as secondary particles.

Thus, the core/shell polymer particles or the separately supplied PTFE and melt-fabricable perfluoropolymer components used in the present invention can be provided in several forms, as primary particles and as secondary particles. When these particles are melt-mixed (blended), the core/shell polymer and the melt-fabricable perfluoropolymer component, as the case may be, loses its particulate form to become a blend of the two polymers, notably wherein the core or PTFE primary particle becomes the dispersed phase and the melt-fabricable perfluoropolymer becomes the continuous phase. The melt mixing can be part of the melt fabrication process, such as occurs during extrusion or injection molding. Typically, the melt blend will be extruded as molding pellets, which can later be used for melt fabrication into the final article. The core/shell polymer useful in the present invention can be made by aqueous dispersion polymerization. In one embodiment, the non-melt flowable PTFE core is prepared in a polymerization that is separate from the polymerization forming the shell melt-fabricable perfluoropolymer, and this core is used to seed the polymerization of the perfluoromonomer forming the melt-fabricable perfluoropolymer shell onto the core. In another embodiment, the core is formed in situ, followed by the polymerization to form the shell on the core. In this embodiment, the non-melt flowable PTFE core is formed by polymerization of TFE. Then the TFE (and initiator) feed to the polymerization reactor is stopped. The polymerization reaction is allowed to complete itself, and the transition to the copolymerization to form the shell polymer will depend on the copolymerization system being used. For example, the TFE remaining in the reactor can be permitted either to be consumed by the PTFE polymerization or to be vented off, and in either case, the copolymerization system for the shell polymer is then established. Alternatively, the copolymerization system for the shell polymer is established while maintaining the TFE concentration in the reactor constant. Then the copolymerization to form the shell is started. Addition of the comonomer along with additional TFE to the reactor will depend on the comonomer. When the comonomer is HFP, the total amount will typically be added at the commencement of the copolymerization reaction. When the comonomer is PAVE, it too may be added at the commencement of the copolymerization reaction or co-fed to the reactor with the TFE feed to the copolymerization reaction. Agitation of the aqueous medium and initiator addition may be stopped when the initial charge of comonomer is fed to the reactor to avoid premature coagulation of the PTFE core. The copolymerization to form the shell is carried out to obtain the relative amount of shell polymer desired and particle size of the core/shell polymer.

The core/shell polymer is preferably formed by first forming the core in situ, followed by the copolymerization to form the shell. This provides a better integration of the shell with the core, by chemical bonding between the core and the shell, wherein the shell copolymer acts as a compatibilizing agent with other melt-fabricable perfluoropolymer (from other core/shell polymer particles or from independently supplied melt-fabricable perfluoropolymer), enabling the matrix of the blend to be formed and the PTFE core particles to become dispersed upon melt mixing without causing disruptions within the matrix that would detract from physical properties.

The polymerization to form the non-melt flowable PTFE core, whether by seed polymerization, by suspension or aqueous dispersion polymerization or in situ is conventional polymerization to form the non-melt flowable PTFE. The polymerization to form the shell is also conventional aqueous dispersion polymerization. Examples of initiators used in both polymerizations include ammonium persulfate, potassium persulfate, bis(perfluoroalkane carboxylic acid) peroxide, azo compounds, permanganate oxalic acid system, and disuccinic acid peroxide. Examples of dispersing agents used in the aqueous dispersion polymerizations include ammonium perfluorooctanoic and perfluoroalkyl ethane sulfonic acid salts, such as the ammonium salt.

A typical aqueous dispersion polymerization process as known in the art involves the steps of precharging an aqueous medium to a stirred autoclave, deoxygenating, pressurizing with TFE to a predetermined level, adding modifying comonomer if desired, agitating, bringing the system to desired temperature, e.g., 60°-100° C., introducing initiator, adding more TFE according to predetermined basis, and regulating temperature. Initiator addition, at the same or different rate, may continue throughout the batch or only for part of the batch. Recipe and operating parameters not fixed by the equipment are commonly selected in order that temperature is maintained approximately constant throughout the polymerization. This same general procedure is followed for polymerizing the perfluoromonomers to make the melt-fabricable perfluoropolymer, except that the polymerization temperature and order of addition of the TFE and the other perfluoromonomer will depend on the identity of the additional perfluoromonomer. Examples of general procedures for making melt-fabricable perfluoropolymer are disclosed in U.S. Pat. No. 5,677,404 (FEP) and U.S. Pat. No. 5,932,673 (PFA). The transition between the polymerization to make the core and the polymerization to make the shell can be varied as will be shown in the Examples herein. The timing of the transition is set in order to obtain the weight proportion of PTFE core desired in the core shell polymer. The weight % core can be determined by comparing the weight of TFE consumed in the polymerization of the core with the weight of perfluoromonomers, e.g. TFE plus HFP or perfluoro(alkyl vinyl ether) consumed in the polymerization of the shell.

The particle size of the core/shell polymer is small enough that the polymer particles remain dispersed in the aqueous medium until the polymerization reaction is completed, whereupon the dispersed core/shell polymer particles can be intentionally coagulated, by such conventional means as increased agitation from the agitation applied during polymerization or by addition of electrolyte. Alternatively, the coagulation can be done by freeze/thaw method such as disclosed in U.S. Pat. No. 5,708,131 (Morgan).

Typically, the average as-polymerized core/shell polymer particle size (diameter), referred to as RDPS (raw dispersion particle size) in the Examples, will be less than one micrometer (submicrometer-size) as determined by the laser light scattering method of ASTM D 4464. Preferably the average polymer particle size is less than about 0.5 micrometer, more preferably less than about 0.3 micrometer, and even more preferably, less than about 0.25 micrometer and most preferably less than about 0.2 micrometer. These particle sizes apply to the particles of PTFE, melt-fabricable perfluoropolymer, and to the core/shell polymer used to form the composition of the present invention. The smaller the average core/shell polymer particle size, the more stable the aqueous dispersion of the polymer particles, enabling the polymerization to be carried out to higher polymer solids content before stopping the polymerization and carrying out coagulation. The average particle size of the core of the core/shell polymer will vary with overall size of the core/shell polymer and the weight proportion of the core desired and will in any event, be smaller than the particle size of the core/shell polymer particles. Thus, since the core/shell polymer particles are on average submicrometer-size, so will the core particles be submicrometer-size when the core/shell polymer particles are melt-mixed to form the continuous phase of melt-fabricable perfluoropolymer with the core PTFE particles dispersed therein. Similarly, for each of the core/shell polymer average particle sizes cited above, the core particles will be smaller. Thus, for the average core/shell polymer particle size of less than about 0.3 micrometer, the average particle size of the core therein will also be less than about 0.3 micrometers. The particle size of the core in the core/shell polymer incorporated into the melt blend is understood to be the size of the particles of PTFE in the melt blend and articles melt-fabricated from the melt blend, because of the non-melt flowability of the PTFE.

The as-polymerized core/shell polymer particle sizes described above are the primary particles (sizes) of the polymer. Coagulation of the aqueous dispersion of the core/shell primary particles and co-coagulation of the mixed together separately prepared aqueous dispersions of PTFE particles and particles of melt-fabricable perfluoropolymer causes these particles to agglomerate together, and upon drying to become a fine powder having an average particle size depending on the method of coagulation, but of at least about 300 micrometers, as determined by the dry-sieve analysis disclosed in U.S. Pat. No. 4,722,122. The agglomerates of primary particles and thus the particles of the fine powder are often referred as secondary particles.

Thus, the core/shell polymer particles or the separately supplied PTFE and melt-fabricable perfluoropolymer components used in the present invention can be provided in several forms, as primary particles and as secondary particles. When these particles are melt-mixed (blended), the core/shell polymer and the melt-fabricable perfluoropolymer component, as the case may be, loses its particulate form to become a blend of the two polymers, notably wherein the core or PTFE primary particle becomes the dispersed phase and the melt-fabricable perfluoropolymer becomes the continuous phase. The melt mixing can be part of the melt fabrication process, such as occurs during extrusion or injection molding. Typically, the melt blend will be extruded as molding pellets, which can later be used for melt fabrication into the final article. In all these melt-mixed forms, the dispersion/continuous phase structure of the melt-mixed composition is present as indicated by the melt fabricability of the melt mixture. The melt blending or melt fabrication process which includes melt mixing is typically carried out at a temperature above the melting temperature of the polytetrafluoroethylene, which is about 343° C. for the first melt and about 327° C. for subsequent melts and which is above the melting temperature of the melt-fabricable perfluoropolymer. Thus, the melt mixing temperature will typically be at least about 350° C.

all these melt-mixed forms, the dispersion/continuous phase structure of the melt-mixed composition is present as indicated by the melt fabricability of the melt mixture. The melt blending or melt fabrication process which includes melt mixing is typically carried out at a temperature above the melting temperature of the polytetrafluoroethylene, which is about 343° C. for the first melt and about 327° C. for subsequent melts and which is above the melting temperature of the melt-fabricable perfluoropolymer. Thus, the melt mixing temperature will typically be at least about 350° C.

The core/shell polymer useful in the present invention can be prepared as a concentrate, i.e. of relatively high PTFE content for dilution with separately supplied melt-fabricable perfluoropolymer by itself. Separately supplied melt fabricable perfluoropolymer is perfluoropolymer that is not supplied by the core/shell polymer. Submicrometer-size PTFE particles can also be separately supplied. The resultant melt blend causes the melt-fabricable perfluoropolymer from the shell of the core/shell polymer to melt mix with the separately supplied melt-fabricable perfluoropolymer to become indistinguishable as they form together the continuous phase for the dispersed particles of non-melt flowable polytetrafluoroethylene. Preferably the dilution of the core/shell polymer with additional (independently supplied) melt-fabricable perfluoropolymer involves the mixing together of aqueous dispersions of each polymer, followed by co-coagulation of the intermixed dispersion, resulting in an intimate mixing of the primary particles of the polymer from each dispersion with one another. This provides the best overall results for the viscosity of the melt blend in melt mixing accompanying melt fabrication and for the physical properties of articles molded from the blend. Co-coagulation of the mixed dispersions results in the formation of agglomerates, which contain both primary particles of core/shell polymer and separately supplied melt-fabricable perfluoropolymer. The particle sizes of these primary particles and agglomerates (fine powder when dried) are the same as disclosed above with respect to the core/shell polymer particles and agglomerates thereof by themselves. The independently supplied melt-fabricable perfluoropolymer should be compatible with the perfluoropolymer of the shell of the core/shell polymer. By compatible is meant that the melt-fabricable perfluoropolymers become indistinguishable in melt mixing and cooling in forming the continuous phase as described above. Preferably the monomers making up the melt-fabricable perfluoropolymer of the shell and the independently supplied perfluoropolymer are either the same or in the homologous series. The shell polymer and the independently supplied perfluoropolymer are considered to be the same even there may be small difference in concentration of the same perfluoromonomer and/or difference in MFR as occurs from small differences in the polymerization process producing the shell polymer as compared to producing the perfluoropolymer by itself. This provides the indistinguishability of the shell perfluoropolymer and independently supplied perfluoropolymer resulting from melt mixing to form the continuous phase of the blend. The most common melt-fabricable perfluoropolymers, FEP and PFA are incompatible with one another, one indicia of which is that magnified frozen (that is non-molten) cross-sections of the cooled melt blend reveal domains of each perfluoropolymer being present when viewed under polarized light.

In this embodiment, in which the core/shell polymer is a concentrate, the core/shell polymer by itself can be melt-fabricable by itself. Alternatively, the core/shell polymer can have little-to-no melt-fabricability by virtue of high PTFE core content. In this embodiment, the melt-fabricability of the blend of core/shell polymer and separate melt-fabricable perfluoropolymer is enabled by the latter, and the combination of the melt-fabricable perfluoropolymer from the shell of the core/shell polymer and the perfluoropolymer supplied by itself provides the continuous phase of the melt-mixed blend.

In the embodiment wherein the core/shell polymer is a concentrate, the proportions of core/shell polymer and independently supplied perfluoropolymer are chosen to provide in melt blend combination any of the core/shell compositions described above.

In the embodiment wherein the non-melt flowable PTFE and melt-fabricable perfluoropolymer are separately supplied to form the melt-mixed composition, each of these components are preferably made by aqueous dispersion polymerization by polymerization methods well known in the art. The polymerization conditions and ingredients described above can be used, except that shell polymerization over a core is not used in this embodiment. Thus, an aqueous dispersion of the non-melt flowable PTFE and an aqueous dispersion of the melt-fabricable perfluoropolymer will be obtained. In each dispersion, the polymer particles will be submicrometer-size. The core/shell polymer particle sizes and measurement thereof described above for the core/shell polymer applies to each of these aqueous dispersions. These dispersions are mixed together, the result being a mixture of primary particles of each polymer in the resultant aqueous dispersion. Co-coagulation of this dispersion mixture, as described above for the core/shell polymer, forms agglomerates, each containing primary particles of each polymer. The same is true after drying the agglomerates to form fine powder having an average particle size typically at least about 300 micrometers. Melt-mixing of this fine powder to form a composition of the present invention, as in the case of core/shell polymer, provides a mixture of primary particles of each polymer as the starting material for the melt mixing step. The conditions of shear rate in the melt-mixing process are not critical because the mixture of primary particles of each polymer component has already been established prior to melt mixing. Because a high shear rate is associated with high productivity, the shear rate used for the melt mixing will preferably be high, e.g. at least about 75 $s^{-1}$.

EXAMPLES

Test Procedures

The procedures for determining melt creep viscosity, standard specific gravity (SSG), melt flow rate (MFR), core/shell polymer composition, and average core/shell polymer particle size (RDPS) reported in the Examples are disclosed earlier herein. The determination of melt viscosity is also disclosed earlier herein. All of the core/shell polymers and separate melt-fabricable perfluoropolymers disclosed in the Examples exhibited a melt viscosity less than about $5 \times 10^4$ Pa·s at 350° C. and shear rate of 101 $s^{-1}$.

The thixotropy of the melt blends described in the Examples is determined by capillary rheometry method of ASTM D 3835-02 in which the melt temperature of the polymer in the rheometer is 350° C. This method involves the extrusion of molten polymer through the barrel of a Kayeness® capillary rheometer at a controlled force to obtain the shear rate desired. The results are reported in the Examples as melt viscosity change (reduction), $\Delta \eta$ in Pa·s in increasing the shear rate on the molten polymer from 11.9 $s^{-1}$ to 101 $s^{-1}$. The determination of melt viscosity using the rheometer has been discussed hereinbefore. The melt viscosities are determined at the two shear rates, and the viscosity difference is determined by subtracting the melt viscosity at 101 $s^{-1}$ from the melt viscosity at 11.9 $s^{-1}$.

The elongation at break and tensile strength parameters disclosed hereinbefore and values reported in the Examples are obtained by the procedure of ASTM D 638-03 on dumbbell-shaped test specimens 15 mm wide by 38 mm long and having a web thickness of 5 mm, stamped out from 60 mil (1.5 mm) thick compression molded plaques.

The procedure for measuring MIT Flex Life is disclosed at ASTM D 2176 using a 8 mil (0.21 mm) thick compression molded film, unless otherwise indicated.

The compression molding of the plaques and film used in these tests was carried out on fine powder under a force of 20,000 lbs (9070 kg) at a temperature of 350° C. to make 6×6 in (15.2×15.2 cm) compression moldings. In greater detail, to make the 60 mil thick plaque, the fine powder was added in an overflow amount to a chase which was 55 mil (1.4 mm) thick. The chase defines the 6×6 in sample size. To avoid sticking to the platens of the compression molding press, the chase and fine powder filling are sandwiched between two sheets of aluminum foil. The press platens are heated to 350° C. This sandwich is first pressed for 5 min at about 200 lb (91 kg) to melt the fine powder and cause it to coalesce, followed by pressing at 10000 lb (4535 kg) for 2 min, followed by 20000 lb (9070 kg) for 2 min, followed by release of the pressing force, removal of the compression molding from the chase and sheets of aluminum foil, and cooling in air under a weight to prevent warping. The film used in the MIT test used the same procedure except that the chase was 8 mil (0.21 mm) thick and defining a 4×4 in. (10.2 cm×10.2 cm) square cavity. The film samples used in the MIT test were ½ in. (1.27 cm) strips cut from the compression molded film. Compression molding of the core/shell polymer coagulated and dried into fine powder produces the dispersion of the PTFE core in a continuous matrix of the shell perfluoropolymer. The compression molding is necessary to give the test specimen strength. If the powder were merely coalesced by heating at the temperature of the compression molding, to simulate the fusing of a coating, the resultant coalesced article would have little strength. The Examples disclose the formation of melt blends of non-melt flowable PTFE and melt-fabricable perfluoropolymer, starting from core/shell polymer, from core shell polymer used as a concentrate for dilution by additional perfluoropolymer, and from separately supplied polymers. The properties of these melt blends are applicable to, i.e. carry over into, the melt fabricated articles obtained therefrom.

Comparative Example A

This Example shows the polymerization to form a typical high-performing FEP by itself for comparison with Examples preparing core/shell polymer in which FEP is the shell.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., HFP was added slowly to the reactor until the pressure was 444 psig (3.1 MPa). Ninety-two milliliters of liquid PEVE was injected into the reactor. Then TFE was added to the reactor to achieve a final pressure of 645 psig (4.52 MPa). Then 40 mL of freshly prepared aqueous initiator solution containing 1.04 wt % of ammonium persulfate (APS) and 0.94 wt % potassium persulfate (KPS) was charged into the reactor. Then, this same initiator solution was pumped into the reactor at 10 mL/min for the remainder of the polymerization. After polymerization had begun as indicated by a 10 psig (70 kPa) drop in reactor pressure, additional TFE was added to the reactor at a rate of 24.5 lb (11.1 kg)/125 min until a total of 24.5 lbs (11.1 kg) of TFE had been added to the reactor after kickoff. Furthermore, liquid PEVE was added at a rate of 1.0 mL/min for the duration of the reaction. The total reaction time was 125 min after initiation of polymerization. At the end of the reaction period, the TFE feed, PEVE feed, and the initiator feed were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. Solids content of the dispersion was 36.81 wt % and raw dispersion particle size (RDPS) was 0.167 µm. After coagulation, the polymer was isolated by filtering and then drying in a 150° C. convection air oven. This polymer was stabilized by heating at 260° C. for 1.5 hr in humid air containing 13 mol % water. The TFE/HFP/PEVE terpolymer (FEP) had a melt flow rate (MFR) of 37.4 g/10 min, an HFP content of 10.5 wt %, a PEVE content of 1.26 wt %, and a melting point of 260° C. For this material, the viscosity change (reduction), $\Delta\eta$, is 101 Pa·s. The FEP exhibited a tensile strength and elongation at break of 2971 psi (20.8 MPa) and 310%, respectively.

Example 1

Core/shell polymer when the shell polymer is FEP and the proportion of core to shell is widely varied, is made in this Example. A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.04 wt % APS and 0.94 wt % KPS in water was injected to the reactor, then this same initiator was added at 0.5 mL/min. After polymerization had begun as indicated by a 10 psig (70 kPa) drop in reactor pressure, additional TFE was added at 0.2 lb (90.7 g)/min for 10 min. After 2 lbs (9070 g) of TEE had been fed after initiation, the TFE feed was stopped, then the reactor contents were agitated for 10 minutes with the initiator still being fed. The agitator and initiator pumps were stopped, then 1280 mL of HFP were added to the reactor. Agitation was resumed and initiation was resumed using the same solution at a rate of 10 mL/min. The reactor pressure was raised to 600 psi (4.1 MPa) with TFE. An aliquot of 92 mL of PEVE was added to the reactor, then 1 mL/min PEVE and 0.2 lb (90.87 g)/min TFE were added over the remainder of the reaction. After an additional 20 lb (9070 g) of TFE were reacted, the PEVE injection was stopped. Two more lbs (907 g) of TFE were fed, for a total of 24 lb (10.9 kg) TFE for the batch, then the batch was terminated in a manner similar to Comparative Example A. Solids content of the dispersion of the resultant TFE/HFP/PEVE copolymer was 35.8 wt % and raw dispersion particle size (RDPS) was 0.246 µm. The polymer was finished in a manner similar to Comparative Example A. Details of the composition of this core/shell polymer and its properties are presented as Example 1 in Table 1.

Examples 2-6

Examples 2 through 6 were prepared in a manner similar to Example 1, with the proportions of core and shell altered by changing the relative amounts of TFE fed during each phase of polymerization. Details are given in Table 1 below.

TABLE 1

| Example Number | PTFE Core, wt % | HFP Content, wt % | PEVE Content, wt % | HFP Content in Shell, wt % | PEVE Content in Shell, wt % | MFR, g/10 min | Tensile Strength, MPa | Elongation at Break, % | $\Delta\eta$, Pa · s |
|---|---|---|---|---|---|---|---|---|---|
| 1 | 7.6% | 6.84 | 1.37 | 7.41 | 1.48 | 0 | 26.7 | 357 | 12936 |
| 2 | 11.5% | 6.42 | 1.43 | 7.25 | 1.62 | 0.4 | 23.8 | 393 | 6273 |
| 3 | 15.4% | 6.41 | 1.47 | 7.57 | 1.74 | 0.7 | 21.3 | 358 | 6495 |
| 4 | 19.2% | 6.18 | 1.69 | 7.65 | 2.09 | 0 | 24.9 | 394 | 9000 |
| 5 | 26.9% | 5.83 | 1.81 | 7.98 | 2.48 | 0 | 20.9 | 338 | 9113 |
| 6 | 39.0% | 5.08 | 1.30 | 8.34 | 2.12 | 0 | 17.3 | 235 | 10344 |

Each of the polymerizations was carried out to a solids content of 33.8 to 35.8 wt % and the RDPS of the polymer particles ranged from 194 to 261 nm (0.194 to 0.261 micrometers). As compared to the reduction in melt viscosity of 101 Pa·s for typical FEP by itself (Comparison Example A), the core/shell polymer of the present invention exhibits a much greater melt viscosity reduction with increasing shear, with the maximum reduction occurring at the lowest core content tested. This thixotropy enables the core/shell polymer, which exhibits very low MFR, to be melt fabricated when subjected to the higher shear applied in the melt fabrication process. With respect to physical properties, the tensile strength and elongation at break of the core/shell polymer was better than for the FEP by itself at PTFE core contents up to about 30 wt %, and useful tensile strength and elongation at break exist for core contents exceeding core content of about 40 wt %. The best combination of optimum thixotropy and physical properties occur in the range of about 4 to 20 wt % PTFE core when the perfluoropolymer in the shell is FEP. The low-to-no MFR shown for the core/shell polymers in Table 1 is beneficial to the utility of articles melt-fabricated from the core/shell polymers. Such articles (dispersion of PTFE core in perfluoropolmer continuous phase obtained by melt mixing the core/shell polymer) when exposed to high heat such as in a building fire will resist flowing and dripping to thereby remain non-smoking.

Comparative Example B

This Example shows the polymerization of PTFE by itself essentially under the same conditions used for polymerizing TFE to make the non-melt flowable PTFE in the core/shell polymer of Examples 1-6 above and in the Examples to follow to verify that the PTFE is non-melt flowable.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water, 330 mL of a 20 wt % solution of ammonium perfluorooctanoate surfactant in water, and 1.0 g Krytox® 157 FSL, available from E.I. du Pont de Nemours and Company, Inc. Krytox® 157 FSL is a perfluoropolyether carboxylic acid as further described in Table 1 of U.S. Pat. No. 6,429,258. With the reactor paddle agitated at 46 rpm, the reactor was heated to 60° C., evacuated and purged three times with tetrafluoroethylene (TFE). The reactor temperature then was increased to while PEVE was added at 1.0 mL/min. TFE was added at 0.2 lb (90.7 g)/min for 97.5 min. After an additional 19.5 lbs (8845 g) of TEE were added, the TFE, initiator, and PEVE feeds were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. After coagulation, the polymer was isolated by filtering and then drying in a 150° C. convection air oven. This polymer was stabilized by heating at 260° C. for 1.5 hr in humid air containing 13 mol % water. Properties of these polymers are shown in Table 2.

TABLE 2

| Example Number | Krytox® 157FSL Used, g | PTFE Core, wt % | HFP Content, wt % | PEVE Content, wt % | HFP Content in Shell, wt % | PEVE Content in Shell, wt % | MFR, g/10 min | Tensile Strength, MPa | Elongation at Break, % | $\Delta\eta$, Pa·s |
|---|---|---|---|---|---|---|---|---|---|---|
| 7 | 0 | 6.5% | 6.96 | 1.82 | 7.44 | 1.95 | 8.4 | 22.1 | 329 | 2197 |
| 8 | 1 | 6.4% | 8.56 | 1.59 | 9.14 | 1.70 | 7.6 | 21.4 | 316 | 2079 |
| 9 | 2 | 6.4% | 9.18 | 1.31 | 9.81 | 1.40 | 5.8 | 18.0 | 207 | 1710 |
| 10 | 4 | 6.2% | 11.26 | 1.43 | 12.01 | 1.53 | 17.0 | 21.2 | 312 | 1202 |
| 11 | 5 | 6.4% | 9.44 | 1.31 | 10.08 | 1.40 | 9.5 | 22.6 | 323 | 1800 |

103° C. After the temperature had become steady at 103° C., the pressure of the reactor was raised to 250 psig (1.75 MPa) using TFE. Fifty milliliters of an initiating solution consisting of 1.04 wt % APS and 0.94 wt % KPS in water was injected to the reactor, then this same initiator was added at 0.5 mL/min. After polymerization had begun as indicated by a 10 psig (0.07 MPa) drop in reactor pressure, additional TFE was added at 0.2 lb (90.8 g)/min for 7.5 min. After 1.5 lbs (681 g) of TFE had been fed after initiation, the TFE and initiator feeds were stopped and the reactor was vented. The contents of the reactor were cooled to 80° C. before being discharged. Solids content of the dispersion was 4.78 wt % and raw dispersion particle size (RDPS) was 0.089 μm. After coagulation, the polymer was isolated by filtering and then dried in a 150° C. convection air oven. The standard specific gravity (SSG) of the resulting PTFE homopolymer, measured according to the method described in U.S. Pat. No. 4,036,802, was determined to be 2.200. The results demonstrate that the core of the core/shell polymer is non-melt flowable PTFE because it has a measurable SSG. The PTFE also exhibits a melt creep viscosity greater than $10^8$ Pa·s at 380° C. and zero MFR.

Examples 7-11

These Examples show core/shell polymer with approximately the same core content and with varying HFP and PEVE content for the overall core/shell polymer and for the shell FEP.

PTFE dispersions were polymerized in the manner of Comparative Example B, varying the amount of Krytox® 157 FSL used as shown in Table 3. Rather than venting the reaction vessel, however, the TFE feed was stopped, then the contents of the reactor were stirred for 10 min with continuing initiator feed. After 10 min, the initiator feed was stopped, then the reactor pressure was raised to 444 psig (3.1 MPa) with HFP. A 92 mL aliquot of PEVE was injected, then TFE was added to the reactor to a pressure of 650 psig (4.6 MPa). For the remainder of the batch, an initiator solution of 1.04 wt % APS and 0.94 wt % KPS was added at a rate of 10 mL/min, The polymerizations shown in Table 2 were carried out to solids concentrations of 36.2 to 38.7 wt % polymer solids, and the average RDPS of the core/shell polymer was from 76 to 191 nm. As shown in Table 2, both the MFR and melt viscosity as well as physical properties of the core/shell polymer can be changed by changing the shell compositions, using the same TFE, HFP and PEVE comonomers.

Examples 12-14

These Examples show the effect of increasing polymerization initiator concentration in the polymerization to form the FEP shell so as to further increase MFR.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water, 330 mL of a 20 wt % solution of ammonium perfluorooctanoate surfactant in water, and 5.0 g Krytox® 157 FSL. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.04 wt % APS and 0.94 wt % KPS in water was injected to the reactor, then this same initiator was added at 0.5 mL/min. After polymerization had begun as indicated by a 10 psig (0.07 MPa) drop in reactor pressure, additional TFE was added at 0.2 lb (90.8 g)/min for 10 min. After 1.5 lbs (681 g) of TFE fed after initiation, the TFE feed was stopped, then the reactor contents were agitated for 10 minutes with the initiator still being fed. The agitator and initiator pumps were stopped, then the pressure of the reactor was raised to 444 psig (3.1 MPa) with HFP. Agitation was restarted and initiation was resumed at a rate of 10 mL/min using a solution as shown in Table 3. The reactor pressure was raised to 650 psi (4.55 MPa) with TFE. An aliquot of 92 mL of PEVE was added to the reactor, then 1 mL/min PEVE and 0.2 lb (90.7 g)/min TFE were added over the remainder of the reaction. After an additional 19.5 lbs (8845 g) of TFE were added, the TFE, initiator, and PEVE feeds were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. After coagulation, the polymer was isolated by filtering and then drying in a 150° C. convection air oven. This polymer was stabilized by heating at 260° C. for 1.5 hr in humid air containing 13 mol % water. The properties of these polymers are shown in Table 3.

TABLE 3

| Example Number | Shell Initiator Solution APS Conc., wt % | Shell Initiator Solution KPS Conc. wt % | PTFE Core, Wt % | HFP Content, wt % | PEVE Content, wt % | HFP Content in Shell, wt % | PEVE Content in Shell, wt % | MFR, g/10 min | Tensile Strength, MPa | Elongation at Break, % | $\Delta\eta$, Pa·s |
|---|---|---|---|---|---|---|---|---|---|---|---|
| 12 | 1.04 | 0.94 | 6.4% | 9.41 | 1.32 | 10.05 | 1.41 | 9.8 | 22.2 | 269 | 2194 |
| 13 | 2.08 | 1.88 | 6.3% | 11.17 | 1.23 | 11.92 | 1.31 | 20.9 | 19.5 | 320 | 1060 |
| 14 | 2.08 | 1.88 | 6.2% | 11.59 | 1.35 | 12.35 | 1.44 | 28.0 | 17.3 | 274 | 627 |

The polymerizations shown in this Table produced polymer solids contents of 38.2 to 39.3 wt % for the aqueous dispersion polymerization medium, and average RDPS of 142 to 230 nm.

Examples 15-19

These Examples show the preparation of the core/shell polymer using ammonium persulfate as the sole initiator, and changing the initiator concentration at almost constant core content to vary the MFR of the core/shell polymer.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water, 330 mL of a 20 wt % solution of ammonium perfluorooctanoate surfactant in water, and 5.0 g Krytox® 157 FSL. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.834 wt % APS in water was injected to the reactor, then this same initiator was added at 0.5 mL/min. After polymerization had begun as indicated by a 10 psig (0.07 MPa) drop in reactor pressure, additional TFE was added at 0.2 lb (90.8 g)/min for 10 min. After 1.5 lbs (681 g) of TFE fed after initiation, the TFE feed was stopped, then the reactor contents were agitated for 10 minutes with the initiator still being fed. The initiator pump was stopped, then the pressure of the reactor was raised to 444 psig (3.1 MPa) with HFP. Initiation was resumed using a solution as shown in Table 4 at a rate of 10 mL/min. The reactor pressure was raised to 650 psi (4.55 MPa) with TFE. An aliquot of 92 mL of PEVE was added to the reactor, then 1 mL/min PEVE and 0.2 lb (90.8 g)/min TFE were added over the remainder of the reaction. After an additional 19.5 lbs (8853 g) of TFE were added, the TFE, initiator, and PEVE feeds were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. After coagulation, the polymer was isolated by filtering and then drying in a 150° C. convection air oven. The properties of these polymers are shown in Table 4.

TABLE 4

| Ex. No. | Shell Initiator Solution APS Concentration, wt % | PTFE Core, wt % | HFP Content wt % | PEVE Content, wt % | HFP Content in Shell, wt % | PEVE Content in Shell, wt % | MFR, g/10 min | Tensile Strength, MPa | Elongation at Break, % | $\Delta\eta$, Pa·s |
|---|---|---|---|---|---|---|---|---|---|---|
| 15 | 1.89 | 6.32% | 10.47 | 1.00 | 11.17 | 1.07 | 10.8 | 22.8 | 327 | 1005 |
| 16 | 2.37 | 6.21% | 11.86 | 1.14 | 12.64 | 1.21 | 18.2 | 20.8 | 323 | 1093 |
| 17 | 2.84 | 6.25% | 11.41 | 1.06 | 12.18 | 1.13 | 15.2 | 18.1 | 320 | 1168 |
| 18 | 3.31 | 6.19% | 12.33 | 0.95 | 13.14 | 1.01 | 27.4 | 16.1 | 206 | 1170 |
| 19 | 3.79 | 6.17% | 12.72 | 0.97 | 13.55 | 1.04 | 30.7 | 16.3 | 181 | 871 |

The polymerizations carried out for the Examples in Table 4 resulted in polymer solids contents ranging from 30.9 to 39.5 wt % and average RDPS of 100 to 184 nm.

Comparative Example C

This Example shows the copolymerization to make a typical high-performing PFA by itself for comparison with the core/shell polymer containing essentially the same PFA.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water and 240 mL 20 wt % solution of ammonium perfluorooctanoate surfactant in water. With the reactor paddle agitated at 50 rpm, the reactor was evacuated and purged three times with tetrafluoroethylene (TFE). Ethane was added to the reactor until the pressure was 8 in Hg (3.93 psig, $2.71 \times 10^{-2}$ MPa), then 200 mL of perfluoro(ethyl vinyl ether) (PEVE) were added.

The reactor temperature then was increased to 75° C. After the temperature had become steady at 75° C., TFE was added to the reactor to achieve a final pressure of 300 psig (2.07 MPa). An aliquot of 400 mL of a freshly prepared aqueous initiator solution containing 0.2 wt % of ammonium persulfate (APS) was charged to the reactor. This same initiator solution was pumped into the reactor at 5 mL/min for the remainder of the batch. After polymerization had begun, as indicated by a 10 psig (0.07 MPa) drop in reactor pressure, additional TFE was added to the reactor at a rate of 0.167 lb/min (75.6 g/min) until a total of 20 lb (9080 g) of TFE were added after kickoff. PEVE was added at 2.0 mL/min for the duration of the reaction, 120 min. At the end of the reaction period, the TFE, PEVE, and initiator feeds were stopped and the reaction vessel was vented. Solids content of the dispersion was 29.7 wt %, and the raw dispersion particle size (RDPS) was 0.172 µm. After coagulation, the polymer was isolated by filtering and then dried in a 150° C. convection air oven. This PEVE/TFE copolymer had a melt flow rate (MFR) of 29.0 g/10 min, a PEVE content of 3.01 wt %, a melting point of 302° C., and an MIT flex life of 2463 cycles. The viscosity change was 111 Pa·s. The copolymer also exhibited a tensile strength of 3027 psi (21.2 MPa) and elongation at break of 349%.

Example 20

This Example shows the preparation of core/shell polymer in which the shell is essentially the same PFA as Comparative Example C.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water and 240 mL of a 20 wt % solution of ammonium perfluorooctanoate surfactant in water. With the reactor paddle agitated at 50 rpm, the reactor was evacuated and purged three times with tetrafluoroethylene (TFE). The reactor temperature then was increased to 75° C. After the temperature had become steady at 75° C., the pressure of the reactor was raised to 300 psig (2.1 MPa) using TFE. Four hundred milliliters of an initiating solution consisting of 0.2 wt % APS in water was injected to the reactor, then this same initiator was added at 5.0 mL/min. After polymerization had begun as indicated by a 10 psig (0.07 MPa) drop in reactor pressure, additional TFE was added at 0.2 lb (90.8 g)/min for 5 min. After 1 lb (454 g) of TFE was fed after initiation, the TFE and initiator feeds were stopped, then the reactor was slowly vented. After stopping agitation, the reactor vapor space was evacuated. Agitation was resumed at 50 rpm, then the contents were cooled to 25° C. The agitator was again stopped, then the pressure in the reactor was raised to 8 in Hg (3.93 psig, 2.71×10$^{-2}$ MPa) with ethane. After the addition of ethane, the agitator was restarted at 50 rpm and the contents of the reactor were warmed to 75° C. A 200 mL aliquot of perfluoro(ethyl vinyl ether) (PEVE) was added, then the pressure in the reactor was raised to 250 psig (1.75 MPa) with TFE (1.72 MPa). For the duration of the reaction, PEVE was added at 2 mL/min and initiation was resumed using the same solution at a rate of 5 mL/min. The pressure of TFE in the reactor was continuously adjusted to maintain a reaction rate of 0.167 lb TFE/min (75.7 g/min). After 19 lbs (8618 g) TFE reacted in 114 min, the reaction was terminated by stopping TFE, initiator, and PEVE feeds, then venting the reactor. Solids content of the dispersion was 26.3 wt %, and the raw dispersion particle size (RDPS) was 0.192 µm. After coagulation, the polymer was isolated by filtering and then dried in a 150° C. convection air oven. This core/shell polymer had a melt flow rate (MFR) of 8.6 g/10 min, a PEVE content of 2.99 wt %, melting points of 301° C. and 324° C., and an MIT flex life of 5384 cycles. The copolymer also exhibited a tensile strength of 3414 psi (23.5 MPa) and elongation at break of 392%. The PTFE core content was 4.9 wt %, and Δη was 2051 Pa·s. These results are included in Table 5. According to these results, the core/shell polymer, exhibits a melt viscosity reduction of almost 20× of the PFA by itself and improved tensile strength and elongation at break.

Examples 21-24

Examples 21 through 24 were prepared as described in Example 20. The ratio of core polymer to shell polymer was altered by changing the ratio of the TFE consumed by the first phase of the polymerization and the TFE consumed by the second phase of the polymerization. Specific details for Examples 20-24 are given in Table 5 below.

TABLE 5

| Example Number | PTFE Core, wt % | PEVE Content, wt % | PEVE Content in Shell, wt % | MFR, g/10 min | Tensile Strength, MPa | Elongation at Break, % | MIT Flex Life, cycles | Δη Pa·s |
|---|---|---|---|---|---|---|---|---|
| 20 | 4.9% | 2.99 | 3.15 | 8.6 | 23.9 | 392 | 5384 | 2051 |
| 21 | 9.7% | 2.70 | 3.00 | 2.3 | 25.8 | 392 | 22884 | 6772 |
| 22 | 19.5% | 2.41 | 2.99 | 0.0 | 27.0 | 397 | 48748 | 15834 |
| 23 | 29.4% | 1.86 | 2.64 | 0.0 | 26.6 | 411 | 14209 | 41128 |
| 24 | 39.6% | 1.12 | 1.85 | 0.0 | 28.3 | 396 | 3752 | 3500 |

The polymerizations shown in Table 5 were carried out to a polymer solids content of 18.4 to 28.5 wt % and average RDPS of 184 to 192 nm. The results in Table 5 show large reductions in melt viscosity over the entire range of core/shell polymer compositions and improved tensile strength and elongation also over the entire range. Also surprising is the increase in MIT Flex Life, ranging from an increase of at least about 150% to an increase more than 2000%. Preferably the core/shell polymer in which the shell is PFA exhibits an increase in MIT Flex Life of at least 200% as compared to the PFA by itself.

The PTFE/FEP core shell polymer also exhibited favorable MIT Flex Life as compared to the same FEP by itself (1100 cycles) through the range of 4 to 40 wt % PTFE core, i.e. the MIT flex life of the PTFE/FEP core shell polymer was about the same at 10 wt % PTFE core and above, while at lower PTFE content, a substantial improvement was been found to exist. For example, at 7 wt % PTFE core, the MIT Flex Life was 17000 cycles.

Comparative Example D

This Example shows the preparation of a different typical PFA by itself for comparison with core/shell polymer.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water, 5.0 g Krytox® 157 FSL (available from E.I. du Pont de Nemours and Co., Inc.), and 240 mL 20 wt % solution of ammonium perfluorooctanoate surfactant in water. With the reactor paddle agitated at 50 rpm, the reactor was evacuated and purged three times with tetrafluoroethylene (TFE). Ethane was added to the reactor until the pressure was 8 in Hg (3.93 psig, $2.71 \times 10^{-2}$ MPa), then 200 mL of perfluoro(propyl vinyl ether) (PPVE) were added. The reactor temperature then was increased to 75° C. After the temperature had become steady at 75° C., TFE was added to the reactor to achieve a final pressure of 250 psig (1.75 MPa). An aliquot of 400 mL of a freshly prepared aqueous initiator solution containing 0.2 wt % of ammonium persulfate (APS) was charged to the reactor. This same initiator solution was pumped into the reactor at 5 mL/min for the remainder of the batch. After polymerization had begun, as indicated by a 10 psig (0.07 MPa) drop in reactor pressure, additional TFE was added to the reactor at a rate of 0.167 lb/min (75.6 g/min) until a total of 20 lb (9080 g) of TFE were added after kickoff. PPVE was added at 2.0 mL/min for the duration of the batch, 120 min. At the end of the reaction period, the TFE, PPVE, and initiator feeds were stopped and the reaction vessel was vented. When the reactor pressure reached 5 psig (0.035 MPa), the reactor was swept with nitrogen, then the reactor contents were cooled to 50° C. before the dispersion was discharged from the reactor. Solids content of the dispersion was 28.9 wt %, and the raw dispersion particle size (RDPS) was 0.130 µm. After coagulation, the polymer was isolated by filtering and then dried in a 150° C. convection air oven. This TFE/PPVE copolymer had a melt flow rate (MFR) of 8.2 g/10 min, a PPVE content of 3.66 wt %, melting points of 232 and 328° C., and an MIT flex life of 78583 cycles. The tensile strength of the PFA was 3502 psi (24.5 MPa) and the elongation at break was 292%. The viscosity change was 2658 Pa·s.

Example 25

This Example shows the preparation of core/shell polymer in which the shell polymer is essentially the same as Comparison Example D.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water, 5 g Krytox® 157FSL, and 240 mL of a 20 wt % solution of ammonium perfluorooctanoate surfactant in water. With the reactor paddle agitated at 50 rpm, the reactor was evacuated and purged three times with tetrafluoroethylene (TFE). The reactor temperature then was increased to 75° C. After the temperature had become steady at 75° C., the pressure of the reactor was raised to 300 psig (2.1 MPa) using TFE. Four hundred milliliters of an initiating solution consisting of 0.2 wt % APS in water was injected to the reactor, then this same initiator was added at 5.0 mL/min. After polymerization had begun as indicated by a 10 psig (0.07 MPa) drop in reactor pressure, additional TFE was added at 0.2 lb (90.8 g)/min for 5 min. After 4 lb (1816 g) of TFE was fed after initiation, the TFE and initiator feeds were stopped, then the reactor was slowly vented. After stopping agitation, the reactor vapor space was evacuated. Agitation was resumed at 50 rpm, then the contents were cooled to 25° C. The agitator was again stopped, then the pressure in the reactor was raised to 8 in Hg (3.93 psig, $2.71 \times 10^{-2}$ MPa) with ethane. After the addition of ethane, the agitator was restarted at 50 rpm and the contents of the reactor were warmed to 75° C. A 200 mL aliquot of perfluoro(propyl vinyl ether) (PPVE) was added, then the pressure in the reactor was raised to 250 psig (1.75 MPa) with TFE. For the duration of the reaction, PPVE was added at 2 mL/min and initiation was resumed using the same solution at a rate of 5 mL/min. The pressure of TFE in the reactor was continuously adjusted to maintain a reaction rate of 0.167 lb TFE/min (75.7 g/min). After 16 lbs (8618 g) TFE reacted in 96 min, the reaction was terminated by stopping TFE, initiator, and PPVE feeds, then venting the reactor. Solids content of the dispersion was 29.3 wt %, and the raw dispersion particle size (RDPS) was 0.105 µm. After coagulation, the polymer was isolated by filtering and then dried in a 150° C. convection air oven. This core/shell polymer had no detectable melt flow rate (MFR) (0 g/10 min), a PPVE content of 3.42 wt %, melting points of 306 and 326° C., and an MIT flex life of 72502 cycles. The core shell polymer also exhibited a tensile strength of 4097 psi (28.7 MPa) and elongation at break of 370%. The PTFE core content was 19.3 wt %, and $\Delta\eta$ was 19568 Pa·s. These results are included in Table 6.

Examples 26-45

Examples 26 through 45 were prepared as described in Example 25. The ratio of core polymer to shell polymer was altered by changing the ratio of TFE consumed by the first and second phases of the polymerization. Furthermore, the PPVE content in the polymer was varied systematically by changing both the amount of PPVE precharged to the reactor, as well as the rate at which it was added during polymerization. Specific details are given in Table 6 below.

TABLE 6

| Example Number | PPVE Precharge, mL | PPVE Addition Rate, mL/min | PTFE Core, wt % | PPVE Content, wt % | PPVE Content in Shell, wt % | MFR, g/10 min | Tensile Strength, MPa | Elongation at Break, % | MIT Flex Life, cycles | $\Delta\eta$, Pa · s |
|---|---|---|---|---|---|---|---|---|---|---|
| 25 | 200 | 2 | 19.3% | 3.42 | 4.24 | 0 | 28.7 | 370 | 72502 | 19568 |
| 26 | 200 | 2 | 4.8% | 3.96 | 4.16 | 2.0 | 25.8 | 315 | 309473 | 6756 |
| 27 | 200 | 2 | 9.6% | 3.70 | 4.09 | 0.6 | 28.1 | 366 | 116091 | 9468 |
| 28 | 200 | 2 | 14.4% | 3.75 | 4.39 | 0.2 | 28.1 | 358 | 154775 | 10144 |
| 29 | 200 | 2 | 19.3% | 3.48 | 4.32 | 0.0 | 28.6 | 386 | 92820 | 8996 |
| 30 | 200 | 2 | 24.2% | 3.26 | 4.29 | 0.0 | 26.3 | 340 | 169801 | 8393 |
| 31 | 200 | 2 | 29.0% | 3.30 | 4.65 | 0.1 | 27.3 | 383 | 57947 | 12542 |
| 32 | 200 | 2 | 33.9% | 3.10 | 4.69 | 0.0 | 26.9 | 353 | 91448 | 7259 |
| 33 | 200 | 2 | 38.8% | 2.89 | 4.73 | 0.0 | 21.2 | 419 | 48162 | 10561 |
| 34 | 200 | 2 | 43.7% | 2.93 | 5.21 | 0.0 | 28.8 | 422 | 13812 | 14735 |
| 35 | 200 | 2 | 48.7% | 2.66 | 5.18 | 0.0 | 29.1 | 415 | 7142 | 17139 |
| 36 | 211 | 2.1 | 4.8% | 4.59 | 4.82 | 2.0 | 28.4 | 338 | 395879 | 8505 |
| 37 | 222 | 2.2 | 9.6% | 3.80 | 4.21 | 0.7 | 28.9 | 351 | 254853 | 8815 |

TABLE 6-continued

| Example Number | PPVE Precharge, mL | PPVE Addition Rate, mL/min | PTFE Core, wt % | PPVE Content, wt % | PPVE Content in Shell, wt % | MFR, g/10 min | Tensile Strength, MPa | Elongation at Break, % | MIT Flex Life, cycles | Δη, Pa·s |
|---|---|---|---|---|---|---|---|---|---|---|
| 38 | 234 | 2.4 | 14.4% | 4.25 | 4.96 | 0.3 | 28.8 | 344 | 478394 | 9854 |
| 39 | 250 | 2.5 | 19.1% | 4.74 | 5.86 | 0.2 | 28.7 | 363 | 116048 | 8058 |
| 40 | 267 | 2.7 | 23.9% | 4.50 | 5.91 | 0.0 | 29.3 | 363 | 94574 | 9956 |
| 41 | 286 | 2.9 | 28.6% | 4.57 | 6.40 | 0.0 | 30.5 | 368 | 130642 | 9403 |
| 42 | 308 | 3.1 | 33.3% | 4.99 | 7.47 | 0.0 | 29.9 | 387 | 90304 | 6362 |
| 43 | 333 | 3.3 | 38.2% | 4.58 | 7.40 | 0.0 | 29.2 | 395 | 33165 | 8244 |
| 44 | 364 | 3.6 | 42.6% | 5.31 | 9.26 | 0.0 | 27.2 | 365 | 21712 | 10761 |
| 45 | 400 | 4 | 48.5% | 3.00 | 5.83 | 0.0 | 25.3 | 354 | 127306 | 20049 |

The polymerizations of Table 6 were carried out to polymer solids contents of 29.3 to 31.3 wt %, and average RDPS of 95 to 145 nm, except that the core/shell polymer of example 45 had an average RDPS of 250 nm which limited the polymerization to a solids content of 16.9 wt %. For Examples 25 to 35, the amount of PPVE fed to the polymerization remained constant, with the result being that as the PTFE core content increased, the PEVE content of the overall core/shell polymer decreased. For Examples 36 to 45, the PPVE feed to the polymerization of the shell was increased as PTFE core content increased, to approximately keep the PPVE content of the overall core/shell polymer constant. This resulted in an increase in PPVE content for the shell as the PTFE core content increased. The results reported in Table 6 show that some of the core/shell polymers of Examples 25-35 exhibit either better physical properties or melt viscosity reduction or both than the corresponding core/shell polymer of Examples 36-45, while for other core/shell polymers, the corresponding ones in Examples 36-45 are better. Adjustment of the amount of comonomer with the TFE in the polymerization of the shell is another way to adjust the melt and physical properties of the core/shell polymer. The results reported in Table 6 also show melt viscosity reductions of more than 200% greater than the melt viscosity reduction obtained for the PFA by itself over the entire range of PTFE core contents. The tensile strengths and elongations at break for the core/shell polymer were also superior for the core/shell polymer.

Examples 20-45 show core/shell polymer compositions for PFA shell, wherein the PTFE core content ranges from about 4 to about 50 wt %, exhibiting one or more favorable properties of reduced melt viscosity with increased shear and high tensile strength and high elongation at break.

Example 46

This Example shows the use of core/shell polymer of the present invention as a concentrate, blended with melt-fabricable perfluoropolymer by itself.

A core/shell PFA containing 38.4 wt % PTFE core polymerized in the manner of Example 33 was coagulated by freezing, rinsed, and dried overnight at 150° C. One hundred fifty grams of this powder were dry-blended with 150 g of pellets (about 3.5 mm in diameter×about 3.5 mm in length) of a standard PFA made in the manner of Comparative Example D. This standard PFA had an MFR of 13.5 g/10 min and a PPVE content of 4.3 wt %. The resulting blend was introduced to the mixing bowl of a 350 cm³-capacity Haake Rheomix® batch intensive mixer that had been preheated to 350° C. and was equipped with roller blades. The mixture was blended at 50 rpm for 5 min to effect complete melting and mixing of the two components. The resulting blend had a tensile strength of 2900 psi (20.3 MPa), elongation at break is 316%, melt flow rate is 0 g/10 min, and MIT Flex Life is 32,562 cycles. The viscosity reduction of this blend is 26,875 Pa·s. Comparison of these results with Example 29 shows that both the tensile strength and elongation of the blend diminished from blend made solely of the core/shell polymer, but that the thixotropy (reduction in melt viscosity) was much greater.

Example 47

This Example shows the use of core/shell FEP polymer of the present invention as a concentrate, blended with melt-fabricable perfluoropolymer by itself.

A core/shell FEP containing 38.6 wt % PTFE core was polymerized and finished in the manner of Example 7. Fifty grams of this powder were dry-blended with 250 g of pellets of a standard FEP (same dimensions as pellets of Example 46) in the manner of Comparative Example A. This standard FEP had an MFR of 30 g/10 min, an HFP content of 10.4 wt %, and a PEVE content of 1.2 wt %. The resulting blend was introduced to the mixing bowl of a 350 cm³-capacity Haake Rheomix® batch intensive mixer equipped with roller blades that had been preheated to 350° C. The mixture was blended at 50 rpm for 5 min to effect complete melting and mixing of the two components. The resulting blend had a tensile strength of 3087 psi (21.6 MPa), elongation at break is 311%, and melt flow rate is 14.9 g/10 min, and MIT Flex Life is 2459 cycles. The viscosity reduction of this blend is 1086 Pa·s, which is much greater than for the FEP of Example A by itself, without sacrifice in physical properties.

Comparative Example E

This example shows the preparation of a PTFE/FEP composition of matter by melt blending of PTFE fine powder and FEP powder via extrusion.

A dry blend composed of 7 wt % PTFE fine powder and the remainder a compacted FEP powder polymerized in the manner of Comparative Example A was prepared by tumbling. The agglomerated PTFE fine powder had an average particle size of 475 micrometers, a standard specific gravity (SSG) of 2.175, and an HFP content of 0.45 wt %. The compacted FEP powder had an average aggregate size (diameter) of approximately 6 mm (pellets or powder), an MFR of 30, an HFP content of 10.2 wt %, and a PEVE content of 1.2 wt %. The resulting powder blend was fed at a rate of 25 lbs/hr (11.4 kg/hr) to a 28 mm twin screw extruder operating at 350° C. and 217 rpm. A general purpose screw configuration was utilized. The molten output from the 28 mm twin screw extruder was pumped directly to a 1 W single screw extruder equipped with a general metering screw. The single screw extruder operated at 350° C. and 22.1 rpm. The resulting strand was quenched in a trough of cold water, then cut into about 3 mm (length) pellets. This blend had a tensile strength of only 1070 psi (7.5 MPa), elongation at break is 126%, and MFR is 3.59 g/10 min. Comparison of these results with those of Example 11 reveals that the latter exhibits much better physical properties (tensile strength of 22.6 MPa and elongation of 323%), indicating the importance of the dispersion of submicrometer-size-size PTFE particles in the continuous phase of FEP, obtained by starting with submicrometer-size-size core/shell polymer particles in the melt blending process.

Comparative Example F

This example shows the preparation of a PTFE/FEP composition of matter by melt blending of PTFE fine powder and FEP pellets via extrusion.

A dry blend composed of 7 wt % PTFE fine powder and the remainder to total 100 wt % of FEP pellets polymerized in the manner of Comparative Example A was prepared by tumbling. The agglomerated PTFE fine powder had an average particle size of 475 micrometers, a standard specific gravity (SSG) of 2.175, and an HFP content of 0.45 wt %. The oblate spheroid FEP pellets were approximately 3.5 mm in diameter, and have an MFR of 30.5, an HFP content of 10.2 wt %, and a PEVE content of 1.2 wt %. The resulting blend was fed at a rate of 20 lbs/hr (9080 g/hr) to a 28 mm twin screw extruder operating at 350° C. and 217 rpm. A general purpose screw configuration was utilized. The molten output from the 28 mm twin screw extruder was pumped directly to a 1½" (3.8 cm) single screw extruder equipped with a general metering screw. The single screw extruder operated at 350° C. and 22.1 rpm. The resulting strand was quenched in a trough of cold water, then cut into about 3 mm pellets. This blend had a tensile strength of only 1121 psi (7.8 MPa), an elongation at break of 172%, an MFR of 15.1 g/10 min, and an MIT Flex Life of 2924 cycles. The viscosity change of this blend is 674 Pa·s. Similar to Comparative Example E, these properties are greatly inferior to those of Example 11.

Comparative Example G

This example shows the preparation of a PTFE/PFA composition of matter by melt blending of PTFE fine powder and PFA pellets via extrusion.

A dry blend composed of 20 wt % PTFE fine powder and the remainder PFA pellets polymerized in the manner of Comparative Example D was prepared by tumbling. The agglomerated PTFE fine powder had an average particle size of 475 micrometers, a standard specific gravity (SSG) of 2.175, and an HFP content of 0.45 wt %. These standard PFA pellets were oblate spheroids approximately 3.5 mm in diameter, and had an MFR of 13.5 g/10 min and a PPVE content of 4.3 wt %. The resulting blend was fed at a rate of 25 lbs/hr (11.4 kg) to a 28 mm twin screw extruder operating at 350° C. and 210 rpm. A general purpose screw configuration was utilized. The molten output from the 28 mm twin screw extruder was pumped directly to a 1½" (3.8 cm) single screw extruder equipped with a general metering screw. The single screw extruder operated at 350° C. and 21.5 rpm. The resulting strand was quenched in a trough of cold water, then cut into about 3 mm pellets. This blend has a tensile strength of 1121 psi (7.8 MPa), an elongation at break of 172%, and an MFR of 4.1 g/10 min. These properties are greatly inferior to those of the core/shell compositional counterpart, Example 25, which exhibited tensile strength of 28.7 MPa and elongation of 370%.

Example 48

This Example describes the blending of FEP aqueous dispersion and ultra-high molecular weight PTFE aqueous dispersion. Polymer C (non-melt flowable PTFE). The FEP is that which was prepared according to Comparative Example A. The PTFE aqueous dispersion was prepared as described below:

A cylindrical, horizontal, water-jacketed, paddle-stirred, stainless steel reactor having a length to diameter ratio of about 1.5 and a water capacity of 10 gallons (37.9 L) was charged with 19.5 kg of demineralized water, 600 grams of paraffin wax, 60 ml of a 20 wt % solution of ammonium perfluorooctanoate dispersant (C-8), 10 ml of a 2 wt % oxalic acid solution, and 1 gram succinic acid. With the reactor paddle agitated at 46 rpm, the reactor was heated to 65° C., evacuated and purged three times with tetrafluoroethylene (TFE). The reactor temperature then was increased to 80° C. After the temperature was steady at 80° C., TFE was added slowly to the reactor until the pressure was 2.75 MPa. Then 245 mL of freshly prepared aqueous initiator solution containing 0.015% $KMnO_4$ and 0.007% ammonium phosphate in water were added to the reactor at the rate of 80 ml/min. Then, this same initiator solution was pumped into the reactor at 5 mL/min. TFE was added at a rate sufficient to maintain the pressure at 2.75 MPa. After 7.0 kg of TFE was added following initial pressurizing with TFE, initiator solution addition was stopped. The polymerization time to the stopping of initiator addition was 57 min. After a total of 12.6 kg of TFE had been added after initial pressureup, the TFE and the C-8 solution feeds were stopped and the polykettle was vented. The length of the reaction, measured from the start of the first initiator injection to the termination of TFE feed, was 183 min. The contents were discharged from the polykettle and the supernatant wax was removed. Solids content of the raw dispersion was 39.3 wt % and RDPS was 289 nm. A portion of the dispersion was diluted to 11 wt % solids and coagulated in the presence of ammonium carbonate under vigorous agitation conditions. The coagulated dispersion (fine powder) was separated from the liquid and dried at 150° C. for three days. The PTFE resin had SSG of 2.159 and a melt creep viscosity of at least $1 \times 10^{11}$ Pa·s at 380° C., which is the upper limit of measurement.

The aqueous dispersions of Comparative Example A and the PTFE prepared in the preceding paragraph were mixed together by rolling at a rate of 5-10 rpm for 10 minutes, resulting in a blend that was 7 wt % PTFE and 93 wt % FEP on a dry solids basis. The polymer blend was isolated by freezing, filtering, and then drying in a 150° C. convection air oven. This polymer was stabilized by heating at 260° C. for 1.5 hr in humid air containing 13 mol % water. The resulting blend had a melt flow rate of 0 g/10 min and viscosity change (reduction), $\Delta\eta$, of 6434 Pa·s. The blend also exhibited a tensile strength and elongation at break of 2676 psi (18.45 MPa) and 219%, respectively.

Example 49

This Example describes the blending of FEP aqueous dispersion of Comparative Example A (FEP) and small particle high molecular weight (non-melt flowable) PTFE made as described in the following paragraph.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.04 wt % APS and 0.94 wt % KPS in water was injected to the reactor, then this same initiator was added at 0.5 mL/min. After polymerization had begun as indicated by a 10 psig (0.07 MPa) drop in reactor pressure, additional TEE was added at 0.2 lb (90.8 g)/min for 7.5 min. After 1.5 lbs (681 g) of TFE fed after initiation, the TFE and initiator feeds were stopped and the reactor was vented. The contents of the reactor were cooled to 80° C. before being discharged. Solids content of the dispersion was 4.81 wt % and raw dispersion particle size (RDPS) was 0.138 μm. A portion of the dispersion was coagulated, then after coagulation, the polymer was isolated by filtering and then dried in a 150° C. convection air oven. The standard specific gravity (SSG) of the resulting PTFE homopolymer was 2.217. The results demonstrate that the core is non-melt flowable PTFE because it has a measurable SSG. The PTFE also exhibited a melt creep viscosity greater than $10^8$ Pa·s at 380° C.

Aqueous dispersions of the FEP of Comparative Example A and the PTFE prepared in the preceding paragraph were mixed by rolling at a rate of 5-10 rpm for 10 minutes, resulting in a blend that was 7 wt % PTFE and 93 wt % FEP on a dry solids basis. The polymer blend was isolated by freezing, filtering, and then drying in a 150° C. convection air oven. This polymer was stabilized by heating at 260° C. for 1.5 hr in humid air containing 13 mol % water. The resulting blend had a melt flow rate of 14.8 g/10 min and exhibited a viscosity change (reduction), $\Delta\eta$, of 756 Pa·s. The blend exhibited a tensile strength and elongation at break of 2997 psi (20.66 MPa) and 306%, respectively.

Example 50

This Example describes the blending of PFA dispersions of Comparative Example D and high molecular weight PTFE, which contains HFP modifier, as prepared in the following paragraph. A cylindrical, horizontal, water-jacketed, paddle-stirred, stainless steel reactor having a length to diameter ratio of about 1.5 and a water capacity of 10 gallons (37.9 L) was charged with 19.5 kg of demineralized water, 709 grams of paraffin wax, 3.13 mL of a 20 wt % solution of ammonium perfluorooctanoate dispersant (C-8), 98 mL of a 0.1 wt % solution of $FeCl_2 \cdot 4H_2O$ in water, and 101 mL of a 0.1 wt % solution of $CuCl_2 \cdot 2H_2O$ in water. With the reactor paddle agitated at 46 rpm, the reactor was heated to 65° C., evacuated and purged three times with tetrafluoroethylene (TFE). The reactor temperature then was increased to 91° C. After the temperature was steady at 91° C., 520 mL of a 2 wt % solution of disuccinyl peroxide in water was injected as rapidly as possible. Then, 29.5 mL of hexafluoropropylene (HFP) was injected before the pressure of the reactor was raised to 350 psig using TFE. After polymerization had begun, as indicated by a 15 psig (0.07 MPa) drop in reactor pressure, additional TFE was added to the reactor at a rate of 0.3 lb/min (0.14 kg/min) and the temperature of the reactor and its contents were increased to 93° C. After 1.5 lbs (0.68 kg) of TFE had reacted, a 2 wt % aqueous solution of ammonium perfluorooctanoate was added at a rate of 40 mL/min for the remainder of the reaction. After 29.6 lbs (13.4 kg) of TFE had been consumed, the reaction was terminated by stopping the TFE and the C-8 solution feeds, and the contents of the reactor were allowed to continue to react until the reactor pressure reached 175 psig (1.20 MPa). The length of the reaction, measured as time during which TEE was being fed, was approximately 31 minutes. The contents were discharged from the polykettle and the supernatant wax was removed. Solids content of the raw dispersion was 42.3 wt % and RDPS was 205 nm. A portion of the dispersion was diluted to 11 wt % solids and coagulated in the presence of ammonium carbonate under vigorous agitation conditions. The coagulated dispersion (fine powder) was separated from the liquid and dried at 150° C. for three days. The PTFE resin has SSG of 2.186, melt creep viscosity of $4 \times 10^9$ Pa·s at 380° C., and HFP content of 0.45 wt %.

Aqueous dispersions of the PFA of Comparative Example D and the PTFE prepared according to the preceding paragraph were mixed together by rolling at a rate of 5-10 rpm for 10 minutes, resulting in a blend that was 20 wt % PFA and 80 wt % of the PTFE prepared according to the preceding paragraph, on a dry solids basis. The polymer blend was isolated by freezing, filtering, and then drying in a 150° C. convection air oven. The resulting blend had a melt flow rate of 1.0 g/10 min and exhibited a viscosity change (reduction), $\Delta\eta$, of 14805 Pa·s. The blend exhibited a tensile strength and elongation at break of 3242 psi (22.35 MPa) and 311%, respectively.

Example 51

This Example describes the blending of PFA dispersions of Comparative Example D and as-polymerized very small particle PTFE (non-melt flowable PTFE) prepared as described in the following paragraph.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water, 330 mL of a 20 wt % solution of ammonium perfluorooctanoate surfactant in water, and 5.0 g Krytox® 157 FSL, available from E.I. du Pont de Nemours and Company, Inc. Krytox® 157 FSL is a perfluoropolyether carboxylic acid as further described in Table 1 of U.S. Pat. No. 6,429,258. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.04 wt % APS and 0.94 wt % KPS in water was injected to the reactor, then this same initiator was added at 0.5 mL/min. After polymerization had begun as indicated by a 10 psig (0.07 MPa) drop in reactor pressure, additional TFE was added at 0.2 lb (90.8 g)/min for 7.5 min. After 1.5 lbs (681 g) of TFE fed after initiation, the TFE and initiator feeds were stopped and the reactor was vented. The contents of the reactor were cooled to 80° C. before being discharged. Solids content of the dispersion was 4.8 wt % and raw dispersion particle size (RDPS) was 0.008 μm. A portion of the polymer was coagulated, and after coagulation the polymer was isolated by filtering and then dried in a 150° C. convection air oven. The standard specific gravity (SSG) of the resulting PTFE homopolymer was 2.121. The PTFE also exhibited a melt creep viscosity greater than $10^8$ Pa·s at 380° C.

Aqueous dispersions of the PFA of Comparative Example D and the PTFE prepared according to the preceding paragraph were mixed together by rolling at a rate of 5-10 rpm for 10 minutes, resulting in a blend that was 20 wt % of the PTFE prepared according to the preceding paragraph and 80 wt % PFA on a dry solids basis. The polymer blend was isolated by freezing, filtering, and then drying in a 150° C. convection air oven. The resulting blend has a melt flow rate of 2.0 g/10 min and exhibited a viscosity change (reduction), $M_1$, of 4797 Pa·s. The blend exhibited a tensile strength and elongation at break of 3693 psi (25.46 MPa) and 419%, respectively.

Example 52

This Example shows the preparation of core/shell polymer containing a very small amount of non-melt flowable PTFE.

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water, 5.0 g Krytox® 157 FSL (available from E.I. du Pont de Nemours and Company, Inc.), and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., the pressure of the reactor was raised to 250 psig (1.75 MPa) using TFE. Fifty milliliters of an initiating solution consisting of 1.04 wt % APS and 0.94 wt % KPS in water was injected to the reactor, then this same initiator was added at 0.5 mL/min. After polymerization had begun as indicated by a 10 psig (70 kPa) drop in reactor pressure, additional TFE was added at 0.2 lb (90.7 g)/min for approximately 1 min. After 0.21 lbs (95.3 g) of TFE had been fed after initiation, the TFE feed was stopped, then the reactor contents were agitated for 10 minutes with the initiator still being fed. The agitator and initiator pumps were stopped, then the pressure of the polykettle was increased to 444 psig with HFP. The agitator was restarted and initiation was resumed using the same solution at a rate of 10 mL/min. The reactor pressure was raised to 650 psi (4.5 MPa) with TFE. An aliquot of 92 mL of PEVE was added to the reactor, then 1 mL/min PEVE and 0.2 lb (90.87 g)/min TFE were added over the remainder of the reaction. After an additional 20.79 lb (9430 g) of TFE were reacted, the TFE, initiator, and PEVE feeds were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. After coagulation, the polymer was isolated by filtering and then drying in a 150° C. convection air oven. This polymer was stabilized by heating at 260° C. for 1.5 hr in humid air containing 13 mol % water. Solids content of the dispersion of the resultant TFE/HFP/PEVE copolymer was 39.1 wt % and raw dispersion particle size (RDPS) was 0.113 µm. The PTFE core content of this core/shell polymer was 0.87 wt %, the HFP content was 12.2 wt % in the shell, and the PEVE content was 1.06 wt % in the shell, the remainder to total 100% by weight being TFE. This material had a tensile strength of 3650 psi (25.2 MPa), an elongation at break of 370%, a melt flow rate of 14.8 g/10 min, and a viscosity reduction, $\Delta\eta$, of 713 Pa·s, which is much greater than for the FEP of Comparative Example A. The viscosity change at about 0.1 wt % PTFE core is estimated to be about 2 times greater than for the FEP by itself.

Examples 53-60

These Examples show the preparation of core/shell polymer in which the core is non-melt flowable PTFE and the shell is the melt processible PFA of Comparative Example C, wherein the core content extends to high amounts.

A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water and 240 mL of a 20 wt % solution of ammonium perfluorooctanoate surfactant in water. With the reactor paddle agitated at 50 rpm, the reactor was evacuated and purged three times with tetrafluoroethylene (TFE). The reactor temperature then was increased to 75° C. After the temperature had become steady at 75° C., the pressure of the reactor was raised to 300 psig (2.07 MPa) using TFE. Eighty milliliters of an initiating solution consisting of 0.2 wt % APS in water were injected into the reactor. This same initiator was then added at 5.0 mL/min. After polymerization had begun as indicated by a 10 psig (0.07 MPa) drop in reactor pressure, TFE was added at 0.2 lb (90.8 g)/min for 5 min. After 1 lb (454 g) of TFE was fed after initiation, the TFE and initiator feeds were stopped, then the reactor was slowly vented. After stopping agitation, the reactor vapor space was evacuated. Agitation was resumed at 50 rpm, then the contents were cooled to 25° C. The core has an MFR of zero at 372° C. The agitator was again stopped, then the pressure in the reactor was raised to 8 in Hg (3.93 psig, $2.71 \times 10^{-2}$ MPa) with ethane. After the addition of ethane, the agitator was restarted at 50 rpm and the contents of the reactor were warmed to 75° C. A 200 mL aliquot of perfluoro(ethyl vinyl ether) (PEVE) was added, then the pressure in the reactor was raised to 250 psig (1.75 MPa) with TFE (1.72 MPa). For the duration of the reaction, PEVE was added at 2 mL/min and initiation was resumed using the same solution at a rate of 5 mL/min. The pressure of TFE in the reactor was continuously adjusted to maintain a reaction rate of 0.167 lb TFE/min (75.7 g/min). After 19 lbs (8618 g) TFE reacted in 114 min, the reaction was terminated by stopping TFE, initiator, and PEVE feeds, then venting the reactor. Solids content of the dispersion was 30.2 wt %, and the raw dispersion particle size (RDPS) was 0.099 µm. After coagulation, the polymer was isolated by filtering and then dried in a 150° C. convection air oven. This core/shell polymer had a melt flow rate (MFR) of 4.1 g/10 min, a PEVE content of 2.93 wt %, and a 50 mil MIT flex life of 851 cycles. The core/shell polymer also exhibited a tensile strength of 4075 psi (28.1 MPa) and elongation at break of 353%. The viscosity change was 7780 Pa·s. These results are included as Example 53 in Table 7 below, along with results for additional core shell/polymers with increasing core content, wherein the core is PTFE homopolymer. The ratio of core polymer to shell polymer was altered by changing the ratio of the TFE consumed by the first phase of the polymerization and the TFE consumed by the second phase of the polymerization. Tensile strength and elongation at break were measured both on compression molded plaques by the procedure disclosed under Test Procedures and on strands extruded by the Kayeness capillary rheometer described under Test Procedures operating at 350° C. and 4 s$^{-1}$.

TABLE 7

| Comparative Ex. No. | PTFE Core, wt % | PEVE Content, wt % | PEVE Content in Shell, wt % | MFR, g/10 min | Tensile Strength, MPa plaque | Elongation at Break, % plaque | 1.27 mm MIT Flex Life, cycles | Δη Pa·s | Tensile Strength, MPa strand | Elongation at Break, % strand |
|---|---|---|---|---|---|---|---|---|---|---|
| 53 | 4.85 | 2.93 | 3.08 | 4.12 | 28.1 | 353 | 851 | 7780 | 29.2 | 519 |
| 54 | 9.71 | 2.85 | 3.16 | 3.34 | 28.3 | 353 | 1016 | 8667 | 27.2 | 487 |
| 55 | 19.51 | 2.45 | 3.04 | 0 | 28.4 | 372 | 1796 | 9533 | 30.1 | 334 |
| 56 | 29.4 | 2 | 2.83 | 0 | 28.7 | 384 | 2560 | 5180 | 16.7 | 72 |
| 57 | 49.33 | 1.35 | 2.66 | 0 | 22 | 275 | 2070 | 19283 | 31.3 | 559 |
| 58 | 59.27 | 1.21 | 2.98 | 0 | 20.4 | 298 | 460 | (1) | (1) | (1) |
| 59 | 74.42 | 0.77 | 3 | 0 | 16.6 | 219 | 233 | 16500 | 18.5 | 153 |
| 60 | 89.76 | 0.28 | 2.61 | 0 | 15.5 | 96 | 116 | 17237 | 8.7 | 46 |

(1) not measured

To shorten the time for MIT Flex Life testing the testing reported in Table 3 was done on 1.27 mm thick compression molded films, which gives a much smaller MIT Flex Life, which would be much larger if the testing were done on 0.21 mm thick films. As shown in Table 7, as the core content for the PTFE homopolymer core increase to about 75 wt %, the tensile properties are still reasonably significant to have value. For example at about 75 wt % core content, elongation is still above 200%. The tensile properties of the melt extruded strand are also reasonably high to have value.

Example 61

This Example is directed to improved injection molding and resulting from the use of the melt-mixed composition of the present invention, wherein the composition is obtained by melt mixing core/shell polymer.

PFA 1 used in this Example is a copolymer of tetrafluoroethylene (TFE) and perfluoro(propyl vinyl ether) (PPVE), with PPVE content of 4.1 wt %, and MFR of 29.2 g/10 min.

PFA 2 used in this Example is the same copolymer as PFA 1 except that the PPVE content of 4.2 wt %, and the MFR is 12.6 g/10 min.

State 1 is a core/shell polymer having 4.78 wt % polytetrafluoroethylene core and a PFA shell of composition like that of PFA 1. State 1 MFR is 8 g/10 min.

State 2 is a core/shell polymer having 4.81 wt % polytetrafluoroethylene (PTFE) core and a PFA shell of composition like that of PFA 2. State 2 has an MFR of 4 g/10 min.

All of these polymers were in the form of extruded/cut pellets. In the pellets of the state 1 and state 2 polymers, the core was present as dispersed submicrometer-size particles in a matrix of the PFA from the shell made by melt mixing the core/shell polymer in an extruder.

Test Procedures for this Example

Flex Life—The procedure for measuring MIT Flex Life is in accordance with ASTM D 2176, and the MIT Flex Life values reported in this Example were measured on a 50 mil (1.27 mm) thick film compression molded in the same way as disclosed under Test Procedures at the beginning of the Examples for the compression molding of 60 mil (1.5 mm) thick plaque, except that the thickness of the chase to mold the 1.27 mm thick film was 50 mils (1.27 mm) thick. Use of the thicker film (thicker than the 0.21 mm thick film in the preceding Examples) shortens the time required in the flex test, thereby resulting in much smaller MIT flex life numbers (cycles). The MIT Flex Life determined on the 1.27 mm thick film can be described as the 1.27 mm MIT Flex Life.

Injection Moldability—The "snake flow" test measures the flowability of polymer at shear rates typical of those used in injection molding. A molten polymer sample was injected into a mold having a rectangular channel 12.7 mm by 2.54 mm, the channel being serpentine in shape. The distance that injected polymer travels in the channel is an index of polymer melt flowability. For convenience, the weight of the polymer in the channel ("Shot Weight") is reported.

The equipment used was a Nissei Injection Molding Machine, Model FN-4000. Temperature profile: rear 350° C., Center 350° C.; Front 355° C.; Nozzle 360° C.; mold temperature 180° C.; injection pressures 80 MPa and 120 MPa.

Injection Molding

The core/shell polymers, State 1 and State 2 are compared with PFA 1 and PFA 2 at injection pressure of 80 MPa. State 2 and PFA 2 are also compared at 120 MPa. Tables 8 and 9 summarize the results for injection pressures of 80 MPa and 120 MPa respectively.

TABLE 8

Injection Pressure 80 MPa

| Polymer | PFA 1 | State 1 | PFA 2 | State 2 |
|---|---|---|---|---|
| MFR | 29.2 | 8 | 12.6 | 4 |
| Shot Wt. (g) | 9.6 | 9.0 | 6.0 | 4.5 |

TABLE 9

Injection Pressure 120 MPa

| Polymer | PFA 2 | State 2 |
|---|---|---|
| MFR | 12.6 | 4 |
| Shot Wt. (g) | 13.1 | 12.7 |

The results show that the melt-mixed compositions of the invention have melt flowability under injection molding conditions much higher than would be predicted from their low MFR, thus exhibiting the shear thinning (thixotropic) behavior of core/shell polymer of the present invention. One aspect of the importance of being able to obtain high shot weight with low MFR core/shell polymer is shown by the flex life test results.

The 1.27 mm MIT Flex Life was measured on State 1 and State 2 core/shell polymers of the invention and on PFA 1 and PFA 2. Results are summarized in Table 10.

TABLE 10

| Polymer | PFA 1 | State 1 | PFA 2 | State 2 |
|---|---|---|---|---|
| MFR | 29.2 | 8 | 12.6 | 4 |
| Flex Life (cycles) | 139 | 362 | 418[1] | 880 |

[1] The MIT flex life for 8 mil (0.21 mm) thick film of PFA 2 is about 15,000 cycles.

The flex life test results show that States 1 and 2 melt-mixed compositions, while behaving like polymers of much higher melt flow rate in melt processing, also behave like polymers of low melt flow rate by exhibiting high MIT Flex Life.

What is claimed is:

1. Melt-mixed composition comprising a dispersion of submicrometer-size particles comprising non-melt flowable polytetrafluoroethylene having a melt creep viscosity of at least $1\times10^6$ Pa·s at 380° C. in a continuous phase comprising melt-fabricable perfluoropolymer having a melt flow rate of from about 0.1 to 500 g/10 min as measured in accordance with Table 2 of ASTM D-1238-94a, said non-melt flowable polytetrafluoroethylene constituting at least about 4 wt % of the combined weight of said non-melt flowable polytetrafluoroethylene and said melt-fabricable perfluoropolymer, said composition exhibiting thixotropy when being subjected to increasing shear in the molten state.

2. The melt-mixed composition of claim 1 wherein said thixotropy is characterized by a reduction in melt viscosity upon increasing the shear rate applied to said composition in the molten state from about 10 $s^{-1}$ to about 100 $s^-$ that is at least about 10% greater than the reduction in melt viscosity at the same shear rates for the melt-fabricable perfluoropolymer by itself, as determined by the capillary rheometer method.

3. The melt-mixed composition of claim 2 wherein said reduction is at least 100%.

4. The melt-mixed composition of claim 1 exhibiting an elongation at break at least as high as that for said melt-fabricable perfluoropolymer by itself.

5. The melt-mixed composition of claim 4 wherein said elongation at break exists for said composition wherein said polytetrafluoroethylene constitutes up to 50 wt % of the combined weight of said polytetrafluoroethylene and said melt-fabricable perfluoropolymer.

6. The melt-mixed composition of claim 1 exhibiting an elongation at break of at least about 200% at up to about 30 wt % of said polytetrafluoroethylene, based on the combined weight of said polytetrafluoroethylene and said melt-fabricable perfluoropolymer.

7. The melt-mixed composition of claim 6 wherein said elongation at break is at least 250%.

8. The melt-mixed composition of claim 1 wherein said polytetrafluoroethylene constitutes up to about 75 wt % based on the combined weight of said polytetrafluoroethylene and said melt-fabricable perfluoropolymer.

* * * * *